(12) United States Patent
Abe et al.

(10) Patent No.: US 12,052,505 B2
(45) Date of Patent: Jul. 30, 2024

(54) IMAGE CAPTURING APPARATUS, METHOD OF CONTROLLING SAME, STORAGE MEDIUM

(71) Applicant: CANON KABUSHIKI KAISHA, Tokyo (JP)

(72) Inventors: Hidetoshi Abe, Tokyo (JP); Nobushige Wakamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 17/848,686

(22) Filed: Jun. 24, 2022

(65) Prior Publication Data

US 2022/0329738 A1    Oct. 13, 2022

Related U.S. Application Data

(63) Continuation of application No. PCT/JP2020/045025, filed on Dec. 3, 2020.

(30) Foreign Application Priority Data

Dec. 27, 2019  (JP) .................................. 2019-239279

(51) Int. Cl.
*H04N 23/695* (2023.01)
*H04N 23/62* (2023.01)
(Continued)

(52) U.S. Cl.
CPC .......... *H04N 23/695* (2023.01); *H04N 23/62* (2023.01); *H04N 23/651* (2023.01); *H04N 23/667* (2023.01); *H04N 23/687* (2023.01)

(58) Field of Classification Search
CPC .... H04N 23/695; H04N 23/62; H04N 23/651; H04N 23/667; H04N 23/687;
(Continued)

(56) References Cited

U.S. PATENT DOCUMENTS

2005/0140793 A1* 6/2005 Kojima ................ H04N 23/687
                                                       348/208.99
2006/0274179 A1* 12/2006 Sugiyama .......... H04N 21/4334
                                                       386/E5.067
(Continued)

FOREIGN PATENT DOCUMENTS

JP        07-191360 A      7/1995
JP      2010154374 A       7/2010
(Continued)

OTHER PUBLICATIONS

Sep. 29, 2023 Japanese Office Action, which is enclosed without an English Translation, that issued in Japanese Patent Application No. 2019-239279.

(Continued)

*Primary Examiner* — Jared Walker
(74) *Attorney, Agent, or Firm* — Cowan, Liebowitz & Latman, P.C.

(57) ABSTRACT

An image capturing apparatus comprises an image capture device configured to capture an object image, a rotation device capable of rotating the image capture device, a first calculation unit configured to calculate a first rotation amount of the rotation unit for correcting image blur based on shaking of the image capturing apparatus, a second calculation unit configured to calculate a second rotation amount for searching for an object from an image captured by the image capture unit, and a stopping unit configured to stop the rotation unit in a case where the first rotation amount and the second rotation amount are both less than threshold values respectively set for the first rotation amount and the second rotation amount.

27 Claims, 18 Drawing Sheets

(51) Int. Cl.
*H04N 23/65* (2023.01)
*H04N 23/667* (2023.01)
*H04N 23/68* (2023.01)

(58) Field of Classification Search
CPC .. H04N 23/6812; H04N 23/685; H04N 23/60; H04N 23/68; H04N 23/682; H04N 23/61; G03B 5/00; G03B 15/00; G03B 37/00; G03B 27/646; G03B 2217/005; G03B 2205/0007; G03B 2205/0015; G06T 5/73; G06T 2207/20201
See application file for complete search history.

(56) References Cited

U.S. PATENT DOCUMENTS

| | | | | |
|---|---|---|---|---|
| 2013/0170769 | A1* | 7/2013 | Konno | H04N 23/635 382/296 |
| 2013/0229562 | A1* | 9/2013 | Kamada | H04N 23/63 348/333.01 |
| 2014/0111658 | A1* | 4/2014 | Watanabe | H04N 23/683 348/208.1 |
| 2014/0111659 | A1* | 4/2014 | Miyasako | H04N 23/68 348/208.1 |
| 2014/0184836 | A1* | 7/2014 | Watanabe | H04N 23/6845 348/208.5 |
| 2015/0195436 | A1* | 7/2015 | Samuels | G03B 17/02 348/373 |
| 2017/0142338 | A1* | 5/2017 | Tanaka | H04N 23/69 |
| 2018/0082144 | A1* | 3/2018 | Wakamatsu | H04N 23/695 |
| 2018/0302563 | A1* | 10/2018 | Itoi | H04N 23/667 |
| 2018/0309930 | A1* | 10/2018 | Gyotoku | G02B 7/14 |
| 2018/0316865 | A1* | 11/2018 | Wakamatsu | H04N 23/6812 |
| 2019/0056573 | A1* | 2/2019 | Masugi | G02B 15/145121 |
| 2019/0191082 | A1* | 6/2019 | Uehara | H04N 23/687 |
| 2019/0191088 | A1* | 6/2019 | Murashima | H04N 23/689 |
| 2019/0191090 | A1* | 6/2019 | Murashima | H04N 23/685 |
| 2019/0208127 | A1* | 7/2019 | Murakami | G02B 27/646 |
| 2019/0222767 | A1* | 7/2019 | Imanishi | H04N 23/55 |
| 2019/0253630 | A1* | 8/2019 | Kojima | H04N 23/62 |
| 2019/0285908 | A1* | 9/2019 | Ichihara | H04N 23/6815 |
| 2019/0331983 | A1* | 10/2019 | Kabasawa | H04N 23/60 |
| 2019/0361210 | A1* | 11/2019 | Machida | G02B 15/1451 |
| 2019/0373174 | A1* | 12/2019 | Ba-Tis | G03B 13/36 |
| 2020/0131434 | A1* | 4/2020 | Kwon | G03B 9/06 |
| 2020/0333621 | A1* | 10/2020 | Harada | G02B 15/145523 |

FOREIGN PATENT DOCUMENTS

| | | |
|---|---|---|
| JP | 2011217333 A | 10/2011 |
| JP | 2015172610 A | 10/2015 |
| JP | 2016122132 A | 7/2016 |
| JP | 2016-536868 A | 11/2016 |
| JP | 2017215350 A | 12/2017 |
| JP | 2018-050146 A | 3/2018 |
| JP | 2018180111 A | 11/2018 |
| JP | 2018180341 A | 11/2018 |
| JP | 2019-161539 A | 9/2019 |
| WO | 2015/055655 A1 | 4/2015 |

OTHER PUBLICATIONS

The International Search Report dated Feb. 16, 2021 of International Application No. PCT/JP2020/045025.
Japanese Office Action, an English Translation, which is enclosed without an English Translation, that issued in Japanese Patent Application No. 2019-239279.
The above foreign patent documents were cited in the May 8, 2024 Chinese Office Action, which is enclosed with an English Translation, that issued in Chinese Patent Application No. 202080090370.2.

* cited by examiner

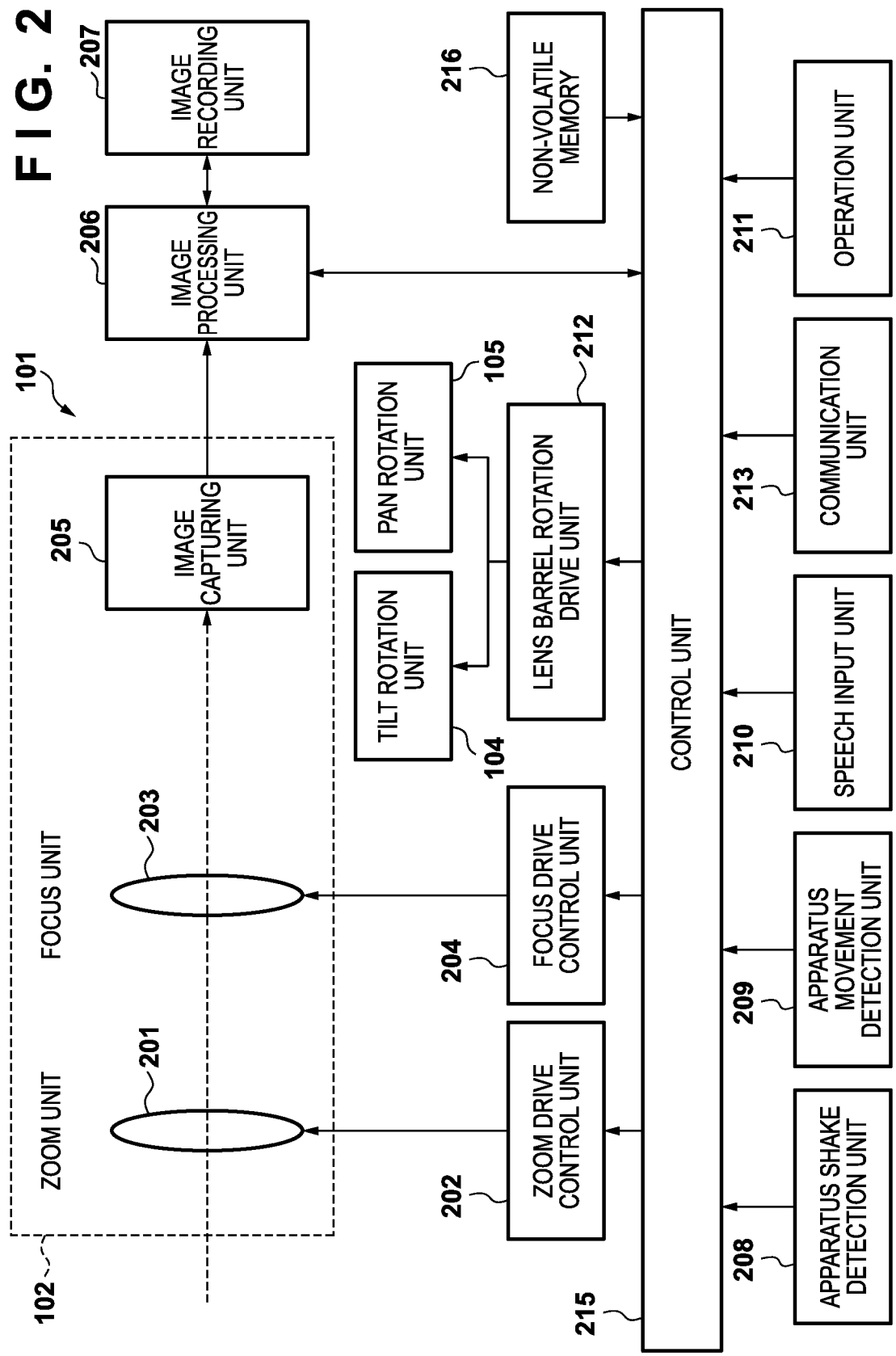

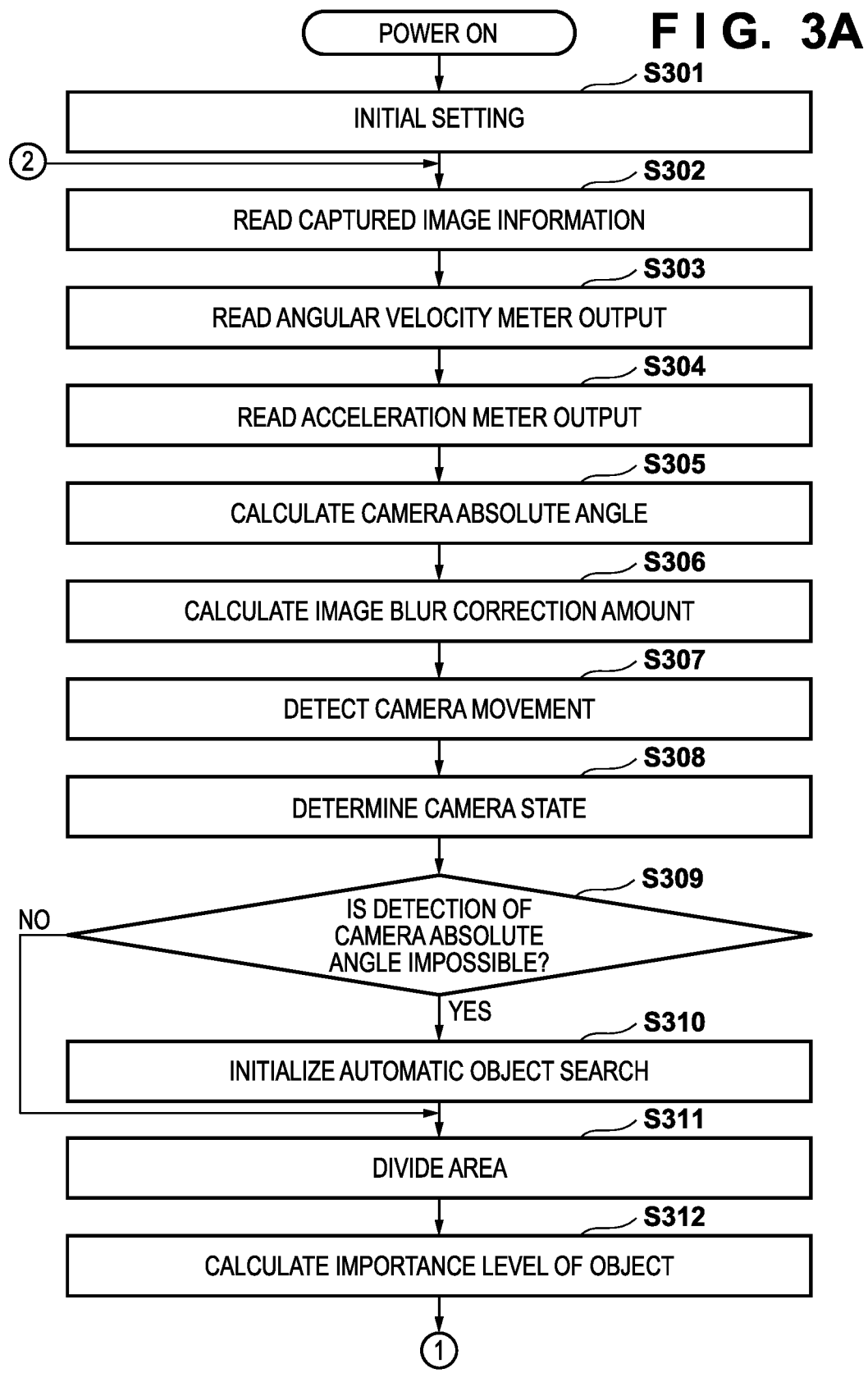

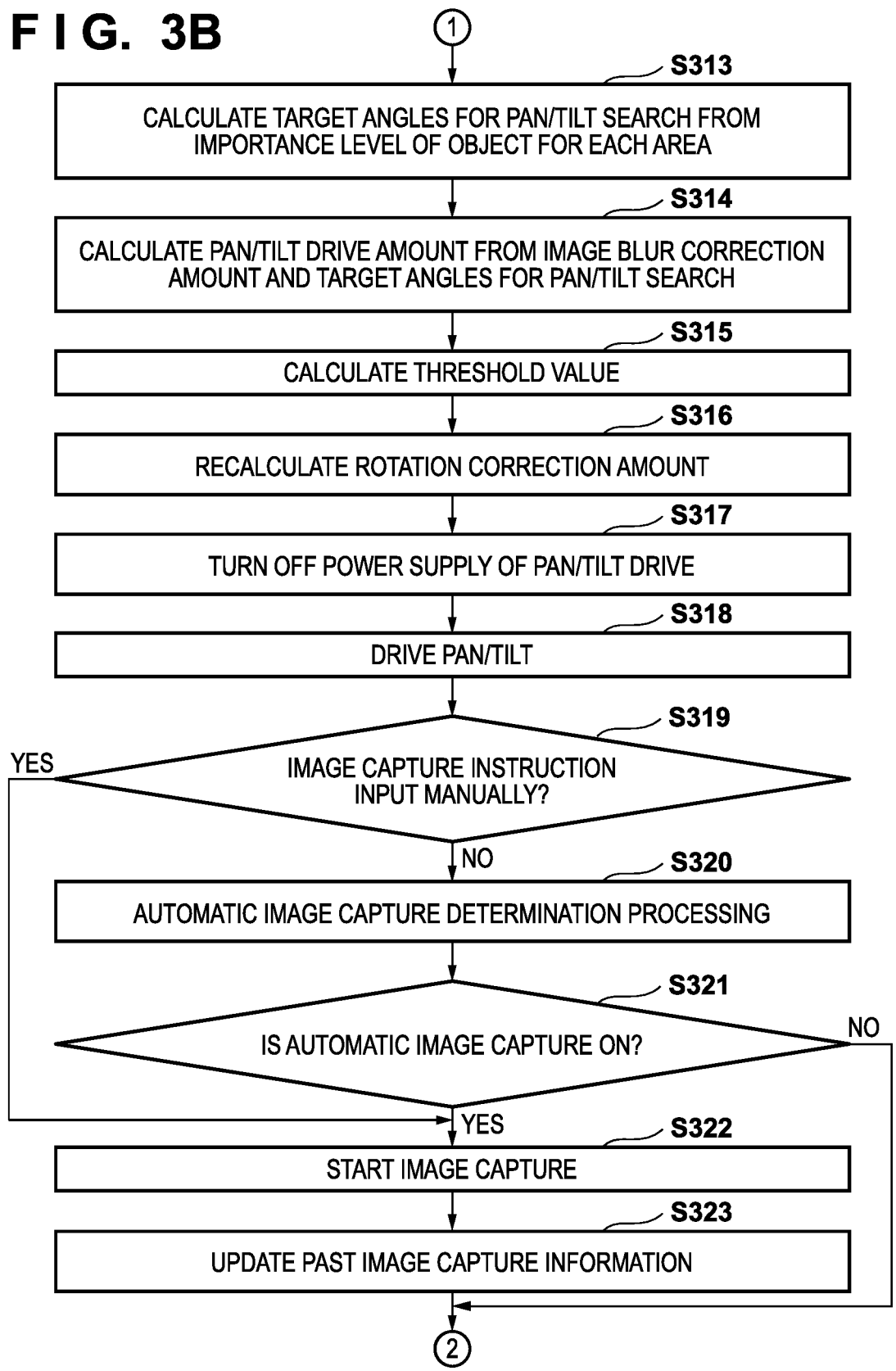

F I G. 14

| AREA | PRESENT TIME TO TIME T1 | TIME T1 TO TIME T2 | TIME T2 TO TIME T3 | TIME T3 TO TIME T4 | ... |
|---|---|---|---|---|---|
| Area1 | 0 IMAGES | 0 IMAGES | 0 IMAGES | 2 IMAGES | |
| Area2 | 1 IMAGE | 1 IMAGE | 1 IMAGE | 0 IMAGES | |
| Area3 | 3 IMAGES | 4 IMAGES | 2 IMAGES | 0 IMAGES | |
| Area4 | 2 IMAGES | 2 IMAGES | 1 IMAGE | 0 IMAGES | |

⋮

F I G. 15

| PERSONAL REGISTRATION OBJECT | PRESENT TIME TO TIME T1 | TIME T1 TO TIME T2 | TIME T2 TO TIME T3 | TIME T3 TO TIME T4 | ... |
|---|---|---|---|---|---|
| Asan | 3 IMAGES | 2 IMAGES | 0 IMAGES | 0 IMAGES | |
| Bsan | 1 IMAGE | 2 IMAGES | 1 IMAGE | 0 IMAGES | |
| Csan | 0 IMAGES | 0 IMAGES | 1 IMAGE | 4 IMAGES | |
| Dsan | 3 IMAGES | 0 IMAGES | 0 IMAGES | 0 IMAGES | |

| REGISTRATION OBJECT | PRESENT TIME TO TIME T1 | TIME T1 TO TIME T2 | TIME T2 TO TIME T3 | TIME T3 TO TIME T4 | ... |
|---|---|---|---|---|---|
| DOG | 2 IMAGES | 1 IMAGE | 0 IMAGES | 0 IMAGES | |
| CAT | 0 IMAGES | 0 IMAGES | 1 IMAGE | 0 IMAGES | |

| SCENE | PRESENT TIME TO TIME T1 | TIME T1 TO TIME T2 | TIME T2 TO TIME T3 | TIME T3 TO TIME T4 | ... |
|---|---|---|---|---|---|
| BLUE SKY | 0 IMAGES | 0 IMAGES | 2 IMAGES | 2 IMAGES | |
| EVENING VIEW | 2 IMAGES | 0 IMAGES | 0 IMAGES | 0 IMAGES | |
| NATURAL VERDURE | 0 IMAGES | 0 IMAGES | 1 IMAGE | 4 IMAGES | |
| NIGHT VIEW | 0 IMAGES | 0 IMAGES | 0 IMAGES | 0 IMAGES | |

⋮

1901

| 1902 | 1905 | 1907 |
|------|------|------|
| 1903 | 1901 | 1908 |
| 1904 | 1906 | 1909 |

IMAGE CAPTURE IMPORTANCE HIGH

C0: FIELD ANGLE CENTER
C1: OBJECT CENTER
↗ : TRACKING DIRECTION
  (↗ SIZE IS CORRECTION AMOUNT)
P: TRACKING TARGET REGION
   (C0 CENTER, RADIUS: THRESHOLD VALUE)

IMAGE CAPTURE IMPORTANCE LOW
C0: FIELD ANGLE CENTER
C1: OBJECT CENTER

P: TRACKING TARGET REGION
   (C0 CENTER, RADIUS: THRESHOLD VALUE)

IMAGE CAPTURING APPARATUS, METHOD OF CONTROLLING SAME, STORAGE MEDIUM

CROSS-REFERENCE TO RELATED APPLICATIONS

This application is a Continuation of International Patent Application No. PCT/JP2020/045025, filed Dec. 3, 2020, which claims the benefit of Japanese Patent Application No. 2019-239279, filed Dec. 27, 2019, both of which are hereby incorporated by reference herein in their entirety.

BACKGROUND OF THE INVENTION

Field of the Invention

The present invention relates to an image capturing apparatus including pan and tilt mechanisms.

Background Art

Cameras with pan and tilt functions are being made smaller and smaller, making it easier for images to be captured with the camera attached to the body (wearable) or hand-held. Capturing images with the camera attached to the body or hand-held tends to result in image blur. This has led to the development of image blur correction technology that drives a motor to move pan and tilt mechanisms in directions to cancel image blur. This is not problematic when there is a stable supply of power, such as in the case of a surveillance camera. However, in a case where the total power capacity is limited, such as in the case of a battery-driven camera, it becomes problematic to run the system for a long period of time while constantly driving the pan and tilt functions.

The technology in Patent Document 1 is a method of operating a wearable life logging automatic image capture apparatus provided with a motion sensor, the method including transitioning to a low power consumption state in response to a signal from the motion sensor. With this technology, the apparatus transitions to a low power consumption state as appropriate when automatic image capture is not necessary, allowing automatic image capture to be performed for a long period of time.

In Patent Document 2, an image capture method including using pan and tilt mechanisms to search for an object is described. The technology described therein includes using a changing unit for changing the center position of the angle of view of a captured image to change the center position of the angle of view of a captured image to search for an object. With this technology, because the object is searched for in an efficient manner, the search time and the power consumed by the search can be reduced. This allows automatic image capture to be performed for a long period of time.

CITATION LIST

Patent Literature

PTL1: Japanese Patent Laid-Open No. 2016-536868
PTL2: Japanese Patent Laid-Open No. 2018-50146

However, there is a problem in that, when the pan and tilt camera is in a state where image blur correction is not necessary, such as when in a low power consumption state or when not searching, continuously running the pan and tilt functions results in a large power consumption and the amount of time for automatic image capture being reduced.

SUMMARY OF THE INVENTION

The present invention is made in light of the problem described above and is directed at greatly reducing power consumption in an image capturing apparatus that performs image blur correction operations using pan and tilt functions.

An image capturing apparatus according to the present invention includes image capture means for capturing an object image; rotation means capable of rotating the image capture means; first calculation means for calculating a first rotation amount of the rotation means for correcting image blur based on shaking of the image capturing apparatus; second calculation means for calculating a second rotation amount for searching for an object from an image captured by the image capture means; and stopping means for stopping the rotation means in a case where either the first rotation amount or the second rotation amount is less than a threshold value set for the first rotation amount and the second rotation amount, respectively.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2 is a diagram illustrating an image capturing apparatus of an embodiment.

FIG. 3A is a flowchart for describing the operations of an image capturing apparatus according to an embodiment.

FIG. 3B is a flowchart for describing the operations of an image capturing apparatus according to an embodiment.

FIG. 14 is a diagram for describing management of the number of captured images for each area.

FIG. 15 is a diagram for describing management of the number of captured images for each individual authentication registered object.

FIG. 16 is a diagram for describing management of the number of captured images for each object recognition registered object.

FIG. 17 is a diagram for describing management of the number of captured images for each scene.

DESCRIPTION OF THE EMBODIMENTS

Figure 1A:
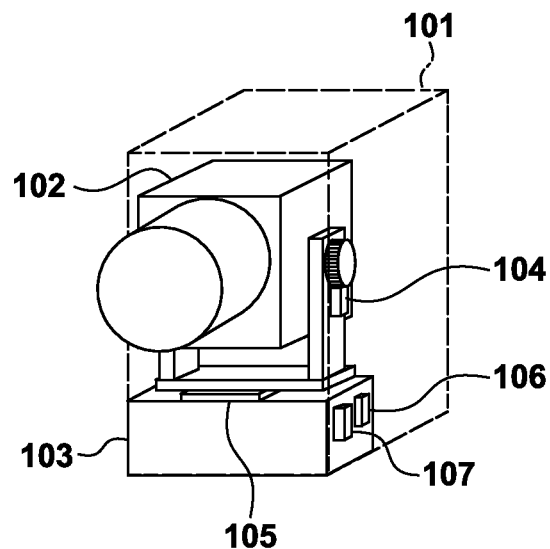
FIG. 1A is a diagram schematically illustrating an image capturing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration of Camera

Figure 1B:
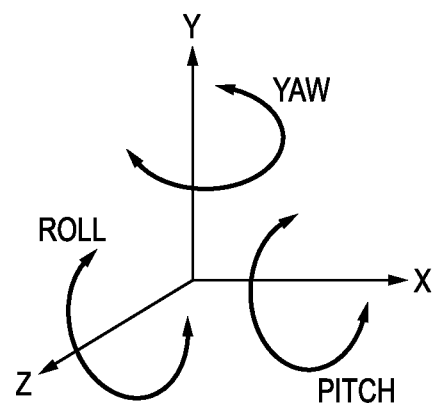
FIG. 1B is a diagram schematically illustrating an image capturing apparatus according to an embodiment of the present invention.

FIGS. 1A and 1B are diagrams schematically illustrating an image capturing apparatus according to an embodiment of the present invention.

An image capturing apparatus 101 illustrated in FIG. 1A is provided with an operation member (hereinafter, referred to as a power button, but may be an operation such as a tap, flick, or swipe on a touch panel) capable of operating a power switch. A lens barrel 102, which is a housing including an imaging lens group and an image sensor for capturing an object image, is attached to the image capturing apparatus 101, and a rotation mechanism is provided that allows the lens barrel 102 to be rotated with respect to a fixing portion 103. A tilt rotation unit 104 is a motor driving mechanism capable of rotating the lens barrel 102 in the pitch direction illustrated in FIG. 1B, and a pan rotation unit 105 is a motor driving mechanism capable of rotating the lens barrel 102 in the yaw direction. In this manner, the lens barrel 102 is able to rotate about one or more axes. Note that in FIG. 1B, the axes are defined with the origin point being the position of the fixing portion 103. An angular velocity meter 106 and an acceleration meter 107 are mounted on the fixing portion 103 of the image capturing apparatus 101. Vibrations in the image capturing apparatus 101 are detected on the basis of the angular velocity meter 106 and the acceleration meter 107, and the tilt rotation unit and the pan rotation unit are rotationally driven on the basis of the detected shake angle. With this configuration, the shake in the lens barrel 102, which is a movable portion, is corrected and inclination is corrected.

FIG. 2 is a block diagram illustrating the configuration of an image capturing apparatus of the present embodiment.

As illustrated in FIG. 2, a control unit 215 includes a processor (for example, a CPU, GPU, microprocessor, MPU, or the like) and a memory (for example, a DRAM, SRAM, or the like). With this configuration, various processing can be executed to control the blocks of the image capturing apparatus 101 and the data transfer between blocks can be controlled. A non-volatile memory (EE-PROM) 216 is an electrically erasable and recordable memory and stores constants, programs, and the like for the operations of the control unit 215.

As illustrated in FIG. 2, a zoom unit 201 includes a zoom lens for performing variation of magnification. A zoom drive control unit 202 controls driving of the zoom unit 201. A focus unit 203 includes a lens for performing focus adjustment. A focus drive control unit 204 controls driving of the focus unit 203.

An image capturing unit 205 includes an image sensor and an A/D converter. The image sensor receives light incident through the lens groups and outputs information about electric charges corresponding to the amount of received light as analog image signals to an image processing unit 206. The image processing unit 206 is an arithmetic circuit installed with a plurality of arithmetic and logic units (ALU) and applies image processing, such as distortion correction, white balance adjustment, and color interpolation processing, to digital image data output after A/D conversion and outputs the processed digital image data. The digital image data output from the image processing unit 206 is converted into a recording format, such as the JPEG format, and is then recorded by an image recording unit 207 on a recording medium such as a non-volatile memory 216. Also, the digital image data output from the image processing unit 206 is converted into a format that is able to be externally displayed and transmitted to an external display apparatus.

A lens barrel rotation drive unit 212 drives the tilt rotation unit 104 and the pan rotation unit 105, driving the lens barrel 102 to rotate in the tilt direction and the pan direction the necessary amount.

An apparatus shake detection unit 208 is installed with the angular velocity meter (gyro sensor) 106 for detecting the angular velocity in the triaxial directions of the image capturing apparatus 101 and the acceleration meter (acceleration sensor) 107 for detecting the acceleration in the triaxial directions of the apparatus, for example. The apparatus shake detection unit 208 calculates the angle of rotation of the apparatus, the amount of shifting of the apparatus, and the like on the basis of the detected signal.

An apparatus movement detection unit 209 detects movement of the image capturing apparatus 101 using position information from the global positioning system (GPS) or using the output from the acceleration sensor 107. The GPS can be provided on the image capturing apparatus 101, or position information detected by an external GPS detection apparatus can be transmitted to the image capturing apparatus 101.

The amount of shifting of the image capturing apparatus 101 is detected by the apparatus shake detection unit 208. However, it is difficult to detect large movement due to the characteristics of the acceleration sensor. Thus, movement within a small range is detected by the apparatus shake detection unit 208, and large movement is detected by the apparatus movement detection unit 209.

A speech input unit 210 acquires an audio signal from the image capturing apparatus 101 periphery from a microphone provided on the image capturing apparatus 101. The microphone can be provided on the image capturing apparatus 101, or audio signals detected by an external microphone apparatus can be transmitted to the image capturing apparatus 101.

An operation unit 211 is used to operate the image capturing apparatus 101 and is provided with a power button and buttons for changing settings of the camera. When the power button is operated, power is supplied to the entire system in accordance with the intended use and the camera is activated. A communication unit 213 communicates with a not-illustrated external device (smart phone or the like) via wired or wireless communication.

Operations of Image Capturing Apparatus

FIGS. 3A and 3B are flowcharts for describing the operations of an image capturing apparatus according to the present embodiment.

The operations illustrated in FIGS. 3A and 3B are started by the main power supply of the image capturing apparatus 101 being turned on, and automatic object search or automatic image capture is performed. Also, manual pan and tilt driving, tracking and searching the instructed object, and manual image capture at the instructed timing may be performed in response to a user operation command by voice input from the speech input unit 210 and a user instruction input by confirming a composition on an external device (not illustrated) via the communication unit 213.

When the power button of the operation unit 211 is operated, first in step S301, the control unit 215 performs various initial settings (for example, image capturing or automatic searching). When the initial settings are complete and image information can be acquired from the image sensor, the process proceeds to step S302.

In step S302, image processing for object detection is performed by the image processing unit 206 on the image signal taken by the imaging capturing unit 205. Using the processed image, person detection, object detection, and other similar object detection is performed. In the case of person detection, the face or body of the object is detected. In face detection processing, a pattern for determining the face of a person is predetermined, and a section matching the pattern included in a captured image can be detected as a face region of a person. Also, a reliability indicating the certainty that it is a face of an object may be calculated at the same time. Reliability is calculated from the size of the face region in the image, the degree of match with a face pattern, and/or the like. In the case of object recognition, similarly, an object matching a pattern registered in advance can be recognized. Also, there is a method of extracting a feature object by a method using a histogram of, for example, hues or saturations in a captured image. With regard to an image of an object captured in the angle of view of the captured image, a distribution derived from a histogram of, for example, hues or saturations in the captured image is divided into a plurality of sections, and processing for classifying captured images for each section is performed. For example, a histogram of a plurality of color components is generated for the captured image, the image is sectioned with a mound-shaped distribution range, the captured images are classified with a region belonging to a combination of the same sections, and an image region of an object is recognized. An evaluation value is calculated for each recognized image region of an object, so that an image region of the object for which the evaluation value is highest can be determined as a main object region. The above-mentioned method can be used to obtain each piece of object information from captured image information. After the captured image information such as object detection information is acquired in step S302, the process proceeds to step S303.

In step S303, the angular velocity information in the apparatus shake detection unit 208 is acquired, and the process then proceeds to step S304. In step S304, the acceleration information in the apparatus shake detection unit 208 is acquired, and the process then proceeds to step S305. In step S305, an absolute angle of the image capturing apparatus 101 is calculated from the detected acceleration information and angular velocity information, and the process then proceeds to step S306.

In step S306, the image blur correction amount for preventing or minimizing image blur caused when the image capturing apparatus 101 is hand-held or attached to the body of a person is calculated.

The method of calculating the absolute angle of the image capturing apparatus in step S305 and the method of calculating the image blur correction amount in step S306 will now be described with reference to a block diagram illustrated in FIG. 4 and diagrams illustrated in FIGS. 5A and 5B.

As illustrated in FIG. 1A, the angular velocity meter 106 and the acceleration meter 107 are disposed on the fixing portion 103 of the image capturing apparatus 101. Therefore, since information about the angular velocity and the acceleration at the position of the fixing portion 103 is output, the absolute angle of the image capturing apparatus calculated on the basis of such information is also calculated as an absolute angle at the position of the fixing portion 103. Thus, to correct a rotational shake of the lens barrel 102 (shake of the image sensor), a correction angle is calculated on the basis of the angular velocity information at the position of the fixing portion 103, so that an image blur correction amount is calculated. Then, the tilt rotation unit 104 and the pan rotation unit 105 are driven on the basis of the image blur correction amount to correct blur.

Figure 4:
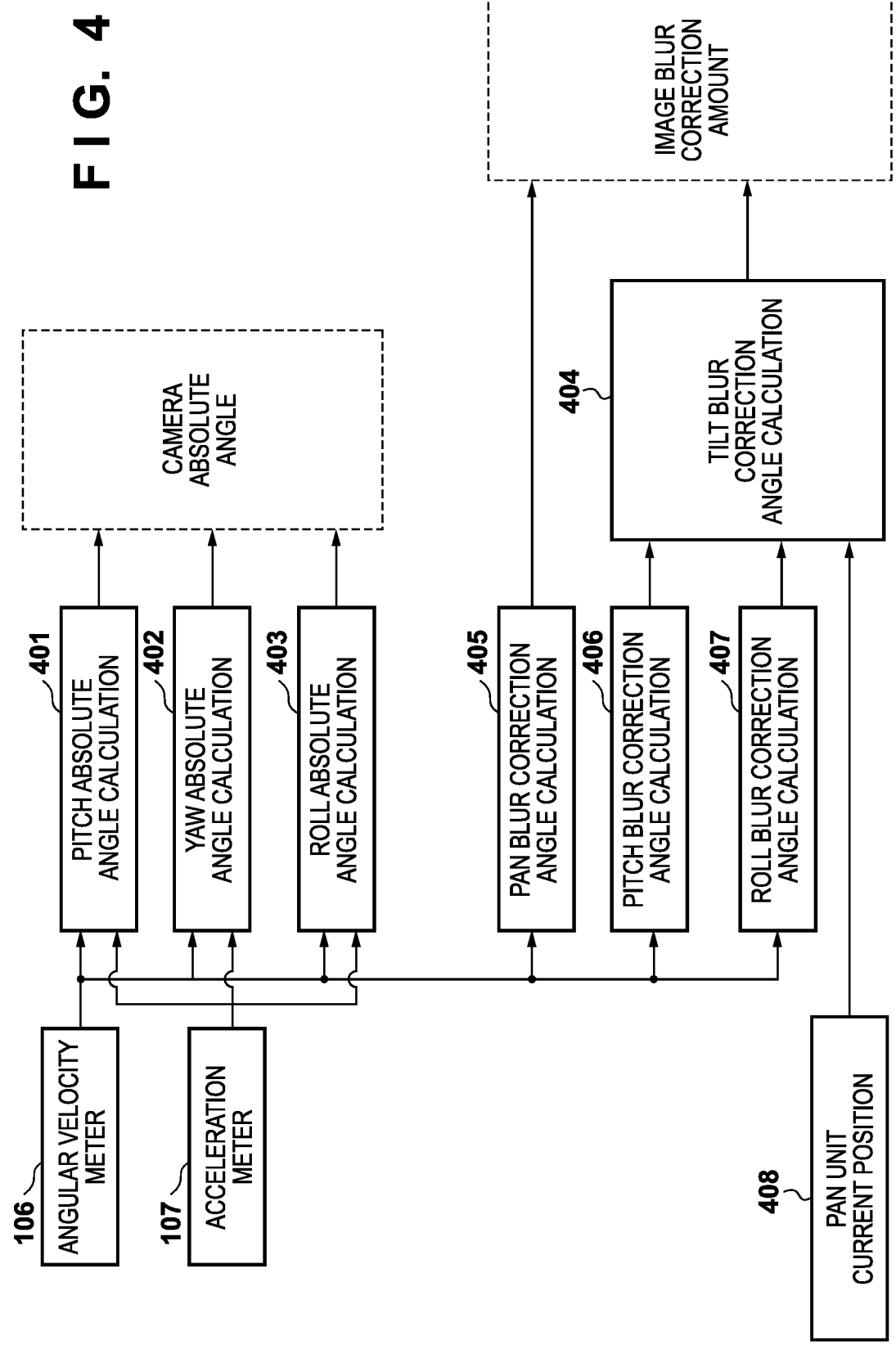
FIG. 4 is a diagram illustrating the block configuration for calculating the absolute angle of an image capturing apparatus and calculating the image blur correction amount.
Figure 5A:
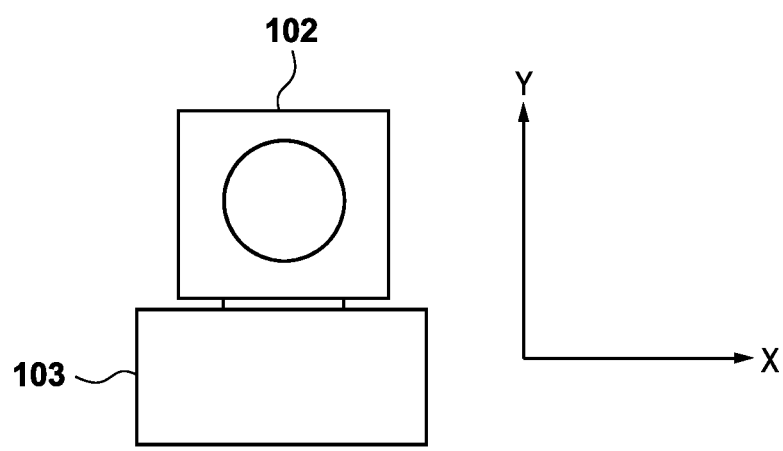
FIG. 5A is a diagram illustrating the relationship between an image capturing apparatus and coordinate axes.

FIG. 4 is a diagram illustrating the block configuration for calculating the absolute angle of the image capturing apparatus and calculating the image blur correction amount.

The method of calculating the absolute angle of the image capturing apparatus will be described below.

Outputs (pitch direction, yaw direction, and roll direction) of the angular velocity meter 106 and outputs (X axis, Y axis, and Z axis) of the acceleration meter 107 are input to a pitch absolute angle calculation unit 401, a yaw absolute angle calculation unit 402, and a roll absolute angle calculation unit 403, respectively. Then, the respective absolute angles in the pitch direction, yaw direction, and roll direction are calculated, so that the absolute angle at the position of the angular velocity meter 106 and the acceleration meter 107, in other words, the camera absolute angle at the fixing portion 103, is calculated.

First, using gravitational acceleration, the absolute angles of the image capturing apparatus in the roll direction, pitch direction, and yaw direction can be calculated from the relationship between outputs of the respective axes of the acceleration meter 107, so that an acceleration computation pitch absolute angle, an acceleration computation yaw absolute angle, and an acceleration computation roll absolute angle are calculated. However, only when the apparatus remains still and is not affected by an acceleration from outside, in other words, only when an acceleration of gravity is dominant in the acceleration detected by the acceleration meter, the tilting angle can be accurately detected. For example, consider a shooting operation performed by the operator holding the camera by the hands while walking, a shooting operation with the camera fixedly attached to a part of the human body, or a shooting operation with the camera attached to a vehicle such as a car or motorbike. In such cases, the influence of an acceleration other than the acceleration of gravity becomes large. Thus, it is difficult to perform accurate absolute angle calculations. Furthermore, in a case where the camera angle is estimated only by the angular velocity meter 106, the orientation and angle can also be estimated by integration calculation of angular velocity outputs, but, since errors due to integration are also accumulated, it is also difficult to perform accurate absolute angle computation.

Therefore, noise regions which are not appropriately dealt with by the angular velocity meter 106 and the acceleration meter 107 are removed, and sensor fusion is used to perform signal synthesis to calculate an absolute angle. Sensor fusion is performed using, for example, a Kalman filter or a complementary filter. A low-frequency noise which has the greatest effect on integration errors of the angular velocity meter 106 is removed, and a high-frequency noise which has the greatest effect on computation errors caused by disturbances in the acceleration meter 107 is removed. Then, the signals are combined. In this manner, absolute angles can be accurately calculated with noise removed.

Thus, pitch absolute angle calculation 401 is performed based on sensor fusion of the gyro pitch angular velocity and the acceleration computation pitch absolute angle from the angular velocity meter 106, so that the pitch absolute angle is computed. Also, yaw absolute angle calculation 402 is performed based on sensor fusion of the gyro yaw angular velocity and the acceleration computation yaw absolute angle from the angular velocity meter 106, so that the yaw absolute angle is calculated. Furthermore, roll absolute angle calculation 403 is performed based on sensor fusion of the gyro roll angular velocity and the acceleration computation roll absolute angle from the angular velocity meter 106, so that the roll absolute angle is calculated.

Figure 5B:
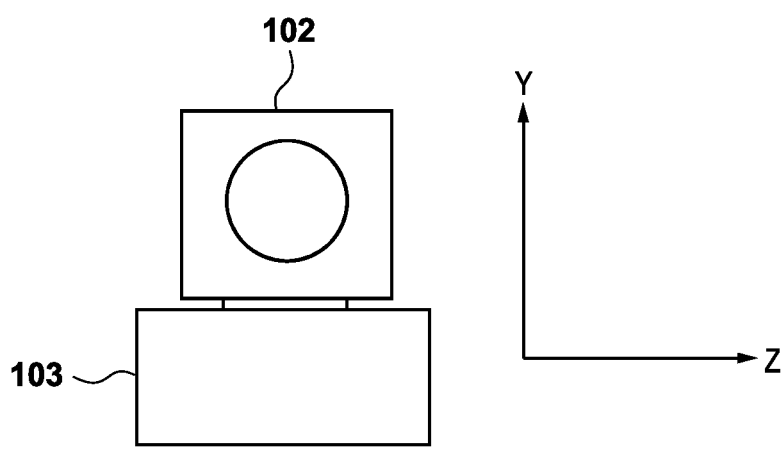
FIG. 5B is a diagram illustrating the relationship between an image capturing apparatus and coordinate axes.

Furthermore, in an axis based on which the absolute angle of the image capturing apparatus is not detectable from the acceleration meter 107 (for example, the yaw rotation axis, which is the axis used for the rotation around the Y axis, in a case where the Y-direction in FIG. 5B fully matches the direction of gravitational force), the absolute angle is calculated only on the basis of the angular velocity meter 106. The last absolute angle obtained when the absolute angle is determined to be able to be calculated from a change in the angle of the image capturing apparatus is set as a start, and the absolute angle is calculated using angular velocity integration in a period in which the absolute angle is not able to be calculated. The absolute angle of the image capturing apparatus is able to be calculated according to the method described above.

Next, a method of calculating the image blur correction amount will be described.

Since the absolute angle of the image capturing apparatus is able to be calculated using to the above-described absolute angle calculation method for the image capturing apparatus, image blur correction can be performed by performing rotary driving of the tilt rotation unit 104 and pan rotation unit 105 on the basis of a signal indicating the absolute angle. However, in a case where image blur correction control is performed on the basis of the absolute angle of the image capturing apparatus, control to continuously maintain the same orientation is performed. This gives rise to issues such as the composition not being changed when the operator captures images while moving or image blur correction control being not possible beyond the movable ends of the correction units. Thus, it is better to perform image blur correction control only on a high-frequency component without performing blur correction on a low-frequency component. In image blur correction amount calculation, since blur correction control on a low-frequency component is not performed, the correction amount is calculated only using the angular velocity meter 106.

The output of the angular velocity meter 106 is integrated after the DC component thereof is cut by a high-pass filter (HPF) and is then converted into an angular signal, so that the blur correction angle is calculated. The angular velocity meter 106 is disposed on the fixing portion 103, and the rotational axis in the yaw direction of the angular velocity meter 106 coincides with the rotational axis of the pan rotation unit 105. Thus, a pan blur correction angle calculation unit 405 calculates a blur correction angle in the pan direction (yaw direction) by performing angular conversion on the yaw angular velocity output from the angular velocity meter 106 using an HPF and integration and rotationally drives the pan rotation unit 105. In this manner, blur correction in the pan direction is performed. With regard to the tilt direction, since the angular velocity meter 106 is disposed on the fixing portion 103, control to perform blur correction in the tilt direction varies depending on the rotation angle of the pan rotation unit 105. The angular velocities in the axial directions defined as illustrated in FIG. 4(b) are assumed to be able to be detected at the position of the angular velocity meter 106, in other words, at the position of the fixing portion 103. In a case where the panning rotation is in the normal position (FIG. 5A, when the X axis is located constantly in the direction perpendicular to the optical axis), a pitch blur correction angle calculated by a pitch blur correction angle calculation unit 406 is directly calculated as the tilt blur correction angle. Also, in a case where the panning rotation angle is an angle rotated 90 degrees from the normal position (FIG. 5B, when the Z axis is located constantly in the direction perpendicular to the optical axis), a roll blur correction angle calculated by a roll blur correction angle calculation unit 407 is directly calculated as the tilt blur correction angle. Between the two cases, a tilt blur correction angle at the panning angle rotational position is calculated from the pitch blur correction angle and the roll blur correction angle on the basis of the panning rotation angle. A tilt blur correction angle corresponding to the panning angle rotational position can be calculated by the following Formula (1).

$$\theta tl = \theta pi \times \cos \times ap + \theta ri \times \sin \theta ap \quad (1)$$

($\theta tl$: tilt blur correction angle, $\theta pi$: pitch blur correction angle, $\theta ri$: roll blur correction angle, and $\theta ap$: panning rotation angle)

In this manner, the tilt blur correction angle is calculated by a tilt blur correction angle calculation unit 404 according to the panning rotation position.

In Formula (1), the tilt blur correction angle is calculated by converting the pitch angle and the roll angle. However, the tilt blur correction angle can also be calculated by a method of calculating the tilt angular velocity from the pitch angular velocity and the roll angular velocity from the angular velocity meter 106 and the panning rotation angle and performing angular conversion on the tilt angular velocity using an HPF and integration processing.

In the above method, the pan blur correction angle and the tilt blur correction angle can be calculated, and image blur correction can be performed by performing rotary driving of the tilt rotation unit 104 and the pan rotation unit 105 according to the respective blur correction angles (image blur correction amounts).

Furthermore, the absolute angle of the lens barrel 102 can also be calculated from the above-obtained absolute angle of the image capturing apparatus and the rotational positions of the tilt rotation unit 104 and the pan rotation unit 105. More specifically, an optical axis-based camera angle in the yaw direction (the yaw absolute angle of the lens barrel 102) can be calculated by subtracting the rotational angle of the pan rotation unit 105 from the yaw absolute angle output from the yaw absolute angle calculation unit 402.

Also, the lens barrel rotational angle in the pitch direction and the lens barrel rotational angle in the roll direction which are converted into the position of the fixing portion 103 can be calculated from the rotational position of the pan rotation unit 105 and the rotational position of the tilt rotation unit 104. Thus, an optical axis-based camera angle in the pitch direction (the pitch absolute angle of the lens barrel 102) can be calculated by subtracting the lens barrel rotational angle in the pitch direction from the pitch absolute angle output from the pitch absolute angle calculation unit 401. Also, an optical axis-based camera angle in the roll direction (the roll absolute angle of the lens barrel 102) can be calculated by subtracting the lens barrel rotational angle in the roll direction from the roll absolute angle output from the roll absolute angle calculation unit 403.

In this manner, if the optical axis-based angle of the image capturing apparatus can be calculated, it can be determined in which angular direction the lens barrel is currently pointing, based on the angle obtained when the image capturing apparatus is activated, for example.

When the absolute angle of the image capturing apparatus and the image blur correction amount are calculated according to the above-described method, the process proceeds to step S307, in which camera movement detection is performed. The image capturing apparatus 101 detects whether or not there is a large movement via the GPS positional information or acceleration information in the apparatus movement detection unit 209. Alternatively, in a configuration which has an external device capable of acquiring GPS positional information and in which the image capturing apparatus 101 and the external device are able to communicate with each other, whether or not the image capturing apparatus 101 has moved can be detected, by receiving movement information transmitted from the external device to the camera 101 when the GPS positional information has varied.

In step S308, camera state determination is performed. What kind of vibration or movement state the camera is currently in is determined on the basis of the camera angle or camera movement amount detected from the angular velocity information, acceleration information, and/or GPS positional information. For example, in a case where image capture is performed with the image capturing apparatus 101 mounted on a vehicle, object information such as the surrounding landscape varies greatly according to the movement distance. Thus, whether or not the apparatus is in a "vehicle movement state", in which the apparatus is moving at high speed while being mounted on, for example, a vehicle, is determined, and this can used in the automatic object search, which is described below. Furthermore, whether or not a change in the camera angle is large is determined, and whether or not the image capturing apparatus 101 is in a "placement shooting state", which has little angle of shake, is determined. Since, in a case where the apparatus is in the "placement shooting state", it can be considered that there is no change in angle of the image capturing apparatus 101 itself, object search for placement shooting can be performed. Moreover, in a case where a change in camera angle is relatively large, a "hand-held state" can be determined and object search for hand-held shooting can be performed. The object search method in each state is described below.

In step S309, whether or not the camera angle detected in step S305 is the accurately calculated is determined, and, in a case where it is hard to detect the absolute angle of the image capturing apparatus, it is determined that detection is impossible and the process proceeds to step S310.

In step S310, automatic search processing initialization is performed and processing such as initialization of the importance level of an object, which is described below, is performed. If it is possible to detect the absolute angle of the image capturing apparatus, the process proceeds to step S311. The state in which it is impossible to detect the absolute angle of the image capturing apparatus includes a case where an impact to the camera is very large and the calculation of the camera angle from the acceleration meter output fails, a case where the camera angular velocity is very great and is beyond detectable range of the acceleration meter, and the like. When such states are detected, it is determined that the absolute angle of the image capturing apparatus is unable to be detected.

In step S311, area division based on the absolute angle of the image capturing apparatus 101 obtained at the time of initial setting in step S301 or at the time of initialization of automatic object search in step S310 is performed. Then, block division based on the area division of the current image acquired by the image capturing apparatus 101 is performed.

Figure 6A:
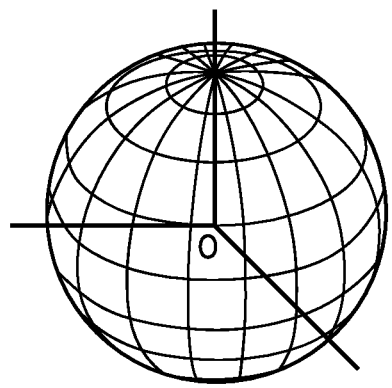
FIG. 6A is a diagram for describing area division for angle regions in the space coordinates of an image capturing apparatus.
Figure 6B:
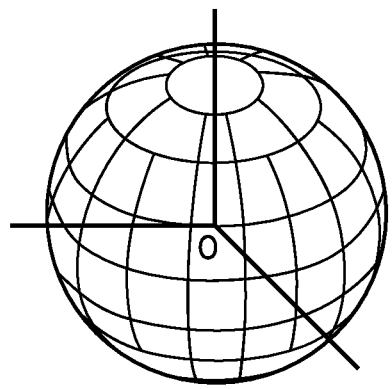
FIG. 6B is a diagram for describing area division for angle regions in the space coordinates of an image capturing apparatus.

Area division is described with reference to FIGS. 6A to 6D. Division into areas is performed on the entire spherical surface with the camera position used as the origin (an origin O being set as the camera position) as illustrated in FIG. 6A. In the example illustrated in FIG. 6A, division is performed with 22.5 degrees in each of the tilt direction and the pan direction. When division is performed as illustrated in FIG. 6A, as the angle in the tilt direction moves away from 0 degrees, the circumference in the horizontal direction becomes smaller, and the area regions become smaller. Thus, as illustrated in FIG. 6B, in a case where the tilt angle is 45 degrees or more, the area region in the horizontal direction is set larger than 22.5 degrees.

Figure 6C:
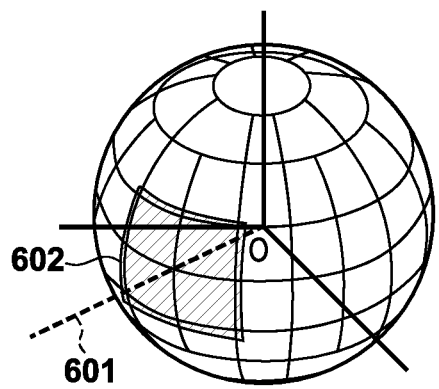
FIG. 6C is a diagram for describing area division for angle regions in the space coordinates of an image capturing apparatus.
Figure 6D:
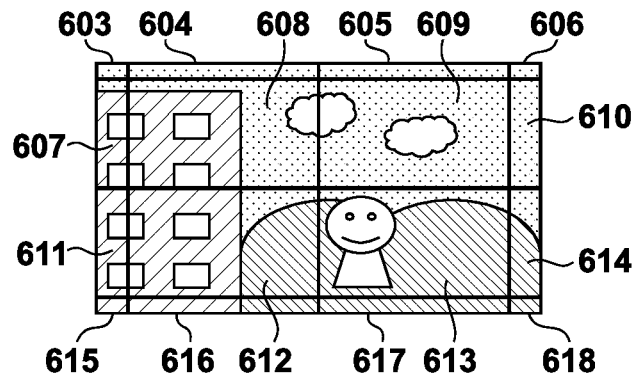
FIG. 6D is a diagram for describing area division for angle regions in the space coordinates of an image capturing apparatus.

FIGS. 6C and 6D illustrate an example in which area division is performed within a shooting field angle. An axis 601 indicates the direction of the image capturing apparatus 101 at the time of initialization, and area division is performed with this direction angle used as the reference position. An area 602 represents a field angle area of a captured image, and an example of the image captured at that time is illustrated in FIG. 6D. The image captured in the field angle is divided into image sections 603 to 618 illustrated in FIG. 6D on the basis of the area division.

Figure 7A:
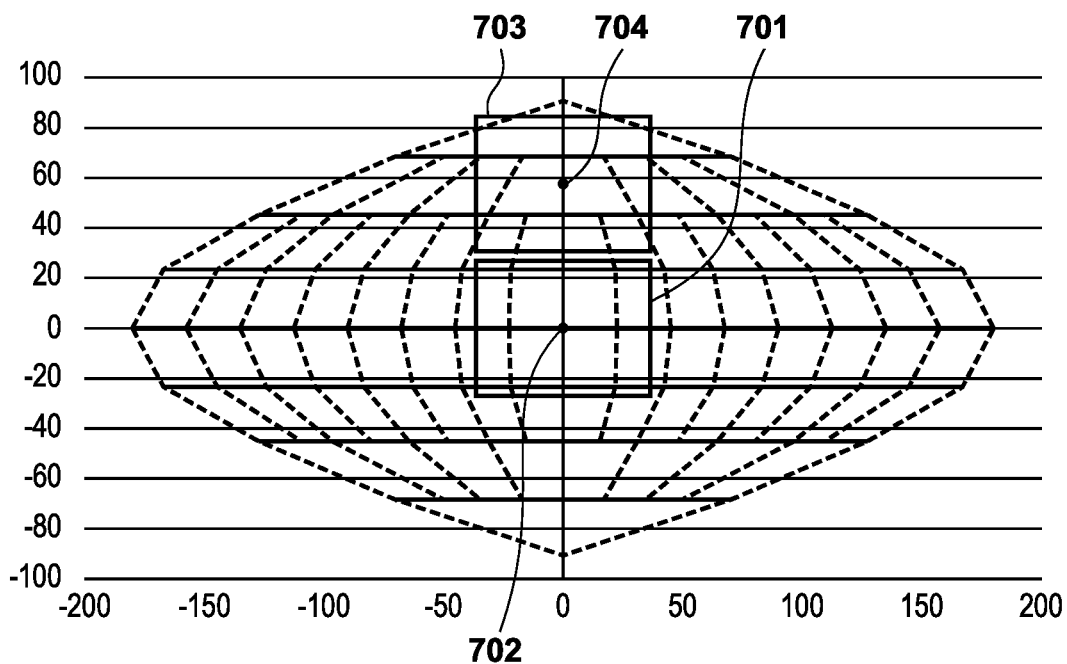
FIG. 7A is a diagram for describing area division in a captured image.
Figure 7B:
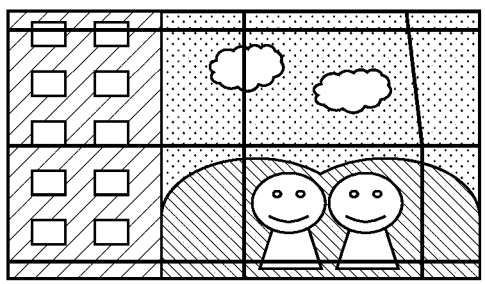
FIG. 7B is a diagram for describing area division in a captured image.
Figure 7C:
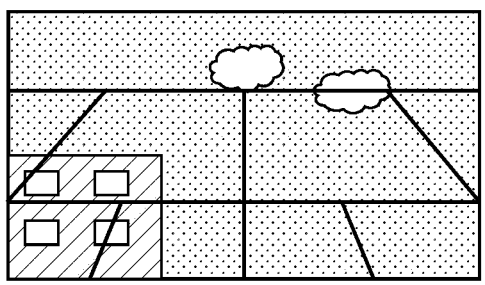
FIG. 7C is a diagram for describing area division in a captured image.

FIGS. 7A, 7B, and 7C illustrate area division in the shooting field angle when the pan direction of the camera is set to the direction 601 obtained at the time of initialization. These are area regions which are based on the absolute angle of the image capturing apparatus 101 at the time of initialization of automatic object search. Also, a captured image is illustrated in FIG. 7B obtained when the tilt angle is 0 degrees, with the camera shooting field angle denoted by 701 and a field angle center denoted by 702. Also, a captured image is illustrated in FIG. 7C obtained when the tilt angle is 55 degrees, with the camera shooting field angle denoted by 703 and a field angle center denoted by 704.

While, in a case where the tilt angle is 0 degrees, since the angular range in the lateral (horizontal) direction is not so greatly different, the difference in size between areas is small, in a case where the tilt angle is 55 degrees, the angular range in the lateral direction greatly varies depending on the angles. Thus, in a case where the tilt angle is 45 degrees or more, the area range in the horizontal direction is set larger than 22.5 degrees, so that the area range is prevented from becoming too small as the tilt angle becomes larger.

Figure 8A:
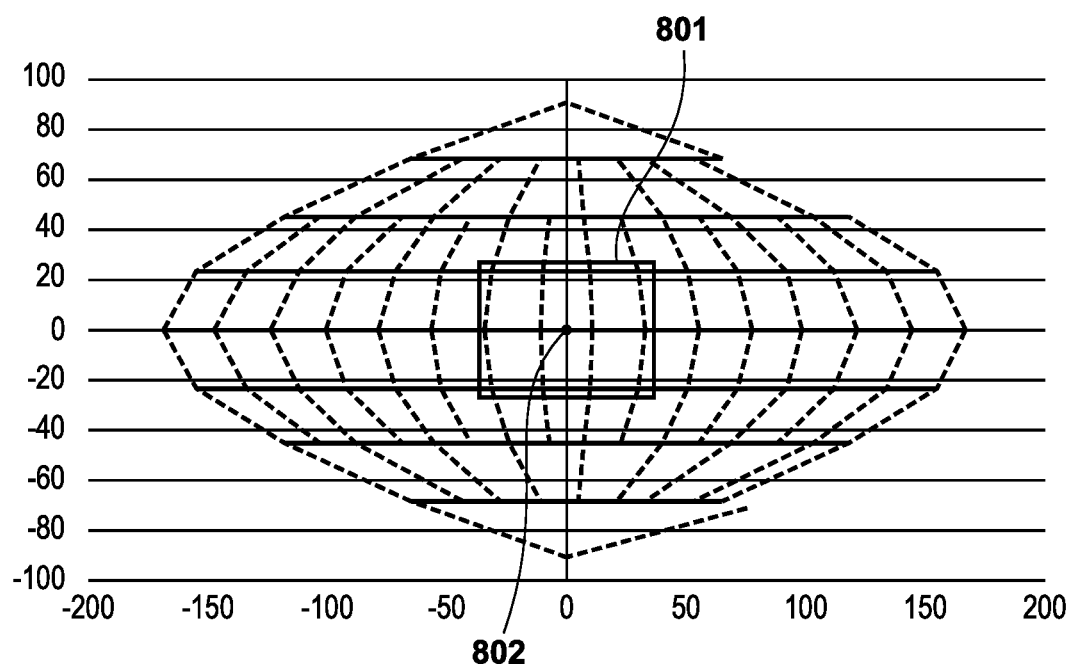
FIG. 8A is a diagram for describing area division in a captured image.
Figure 8B:
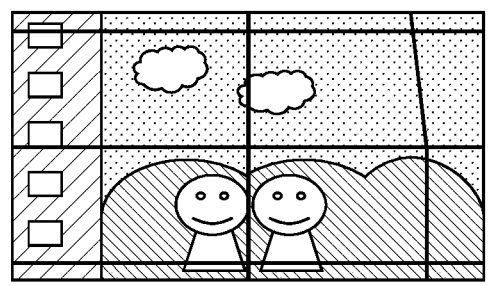
FIG. 8B is a diagram for describing area division in a captured image.

FIGS. 8A and 8B illustrate the area region obtained when the camera has been rotated 11.25 degrees in the pan direction from the camera initial position, and a captured image is illustrated in FIG. 8B obtained when the tilting angle is 0 degrees, with a camera shooting field angle denoted by 801 and a field angle center denoted by 802. As illustrated in FIG. 8A, the area region is set with 11.25 degrees as the center in the horizontal direction.

The area division regions in the shooting field angles described above are obtained by the following Formulae (2) and (3), and all of the division regions present in the field angle are calculated, so that area division is performed in the image as illustrated in FIG. 7B or 7C or FIG. 8B.

$$\theta ay = \theta y + \theta y' \quad (2)$$

$$\theta ax = \theta x' + \cos \theta ay \quad (3)$$

θx: panning angle (based on the camera initial position),
θy: tilting angle (based on the camera initial position),
θx': angle from the panning angle position (the center in the horizontal direction of the image) to the area division center,
θy': angle from the tilting angle position (the center in the vertical direction of the image) to the area division center,
θax: length of the horizontal direction angle from the horizontal center in the image to the horizontal direction area division center,
θay: length of the vertical direction angle from the vertical center in the image to the vertical direction area division center, and
the camera initial position is based on 0 degrees.

While each area division angle is set to 22.5 degrees, the horizontal area division angle in the range of 45 degrees to 67.5 degrees in the vertical direction is set to 45 degrees. In the range of 67.5 degrees to 90 degrees in the vertical direction, division in the horizontal direction is not performed, so that only one area is set.

In this manner, after area division is performed in step S311, the process proceeds to step S312, in which the importance level of an object is calculated.

Hereinafter, the importance level of an object is calculated for each area on the basis of, for example, object information in the acquired image such as that illustrated in FIG. 6D. With respect to an area in which a captured region is small relative to the field angle, such as areas 603, 604, 605, 606, 607, 610, 611, 614, 615, 616, 617, and 618 illustrated in FIG. 6D, the importance level of an object is not determined or updated (for example, when the size of an area is assumed to be 100%, in a case where a captured image region in the area is 50% or less). In each of the set areas described above, the importance level of an object is set under various conditions. The importance level of an object is calculated from, for example, the following items.

Importance Level Setting Corresponding to Person Information

For each area position in the field angle, the importance level is set according to person information.

Known face detection technology includes a method using knowledge (skin color information, parts such as the eye, nose, and mouth) relating to the face, a method using an identification device for face detection via a learning algorithm represented by a neural network, and the like. Also, to improve detection accuracy, typically a combination of face detection methods are used in face detection. From face detection, the size of the face, the orientation of the face, a reliability indicating the certainty that it is a face, and the like are calculated. Furthermore, there is known a technique of detecting a facial expression from information about the detected organs of the face, so that the degree of opening of the eyes can be detected or the degree of smile can be detected. More specifically, a feature value required for detecting a facial expression is acquired from, for example, profiles of the organs of a face (for example, eye, nose, and mouth) and positions of the inner corner of the eye, the outer corner of the eye, the nostril, the corner of the mouth, and the lips. The method of acquiring the feature values includes, for example, a method of performing template matching using templates of face constituent parts and a method of performing a learning algorithm using a large number of sample images of face constituent parts. For example, the degree of smile, closing of the eyes, wink, facial expression estimation (delight, surprise, anger, sadness, and straight face), and gestures can be detected on the basis of the detected feature values.

Furthermore, individual face data can be registered in advance, and personal face authentication for further detecting whether the person is a specific individual person from the detected face can also be performed. It is determined whether or not the detected object is in the same state as a target registered in advance in a database, or the degree of match is determined. Feature information for identifying the object region as an object to be authenticated is extracted from image data of the detected object. Then, the extracted feature information is compared with feature information of an image of the object registered in the database in advance. An authentication evaluation value indicating the degree of similarity obtained by the comparison is used to perform authentication to determine which registration target is the object to be authenticated or whether there is no corresponding registration object. For example, a predetermined threshold value is provided with respect to the authentication evaluation value, and, in a case where the authentication evaluation value is equal to or greater than the predetermined threshold value, it can be determined that the object to be authenticated is the corresponding object registered in the database.

Kr is a value indicating the level of face reliability (for example, as the reliability increases from a low level to a large level, Kr increases), and the reliability is determined using, for example, the size of a face, the orientation of a face, the certainty of a face, and the like.

Ka is a value indicating the level of individual face authentication information, and is set for each face on the basis of the degree of importance for each registered individual face (for example, the degree of importance registered in advance) or past image capture information, which is described below.

Ks is a value indicating the level of facial expression, and is expressed by a level for each face on the basis of the levels corresponding to preset facial expressions (for example, smile, delight, and surprise are set to high levels, and anger, sadness, straight face, and closing of the eyes are set to low levels). Here, the level of each facial expression can be configured to vary according to the degree of facial expression, for example, in the case of smile, the degree of smile.

According to the above-described obtained Kr, Ka, and Ks, a level Flvl corresponding to a person facial expression is obtained by the following Formula (4).

$$Flvl = Kr \times Ka \times Ks \qquad (4)$$

Figure 9:
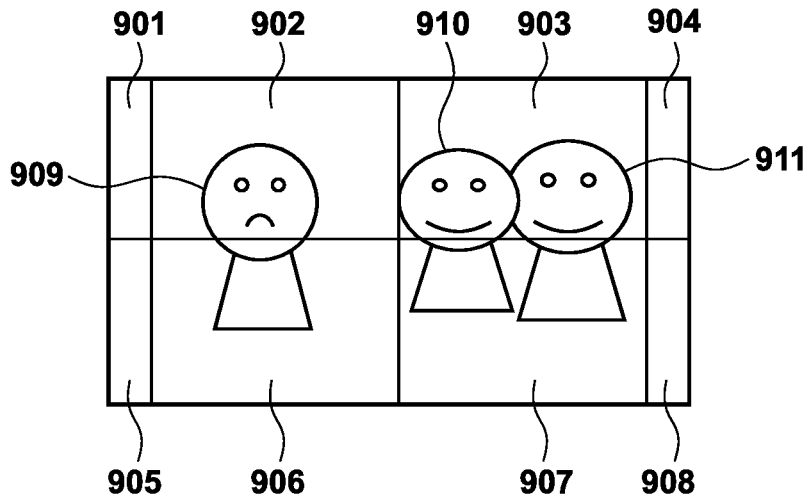
FIG. 9 is a diagram for describing person detection for each area in a captured image.

Level setting corresponding to person information will now be described with reference to FIG. 9. As described above, an area in which a captured region in the image is small, such as areas 901, 904, 905, and 908 in FIG. 9, is not deemed to be an area to be searched and is thus not subjected to determination. Here, a case in which images of three persons (909, 910, and 911) are captured in the field angle is described as an example. The object 909 in this example is an object which is not registered with individual face authentication and to be an object without a smile for the facial expression. The object 910 in this example is an object which is not registered with individual face authentication and to be an object with a smile for the facial expression. The object 911 in this example is an object which is registered with individual face authentication and to be an object with a smile for the facial expression.

Since an image of the person 909 is captured in the areas 902 and 906, level setting is performed on both the areas 902 and 906 according to person information about the person 909. Since the person 909 is not registered with individual face authentication, the gain Ka is "1", and, since the person 909 does not have a smile, the gain Ks is "1", and the level of the person 909 is Kr, and the importance level of the object 909 is determined according to the face reliability.

Since images of the persons 910 and 911 are captured in the areas 903 and 907, level setting is performed on both the areas 903 and 907 according to person information about the persons 910 and 911. Since the person 910 is not registered with individual face authentication, the gain Ka is "1", and, since the person 910 is an object with a smile, the gain Ks is set to a value equal to or greater than "1". Since the person 911 is registered with individual face authentication, the gain Ka is 1 or greater, and, since the person 910 is an object with a smile, the gain Ks is set to a value equal to or greater than "1".

Accordingly, in a case where the levels of face reliability of the person 909, 910, and 911 are the same, the magnitudes of the importance levels of objects corresponds to 911>910>909.

Furthermore, level setting is performed at a rate at which a face is captured. In an area in which the rate of the face image is large, the obtained level described above is directly set, and, in an area in which the rate of the face image is small, the level is changed according to the rate of the face image. For example, in a case where the rates of the face image in the area 903 and the area 907 are 8:2, the levels thereof are set as 10:2.5, respectively.

In this manner, the importance level is set for each area on the basis of the person information.

Importance Level Setting Corresponding to Object Recognition Information

In a case where an object registered in advance is detected, setting of the importance level which is based on object recognition information is performed. For example, setting of the importance level using object recognition is performed using a general object category recognition for "dog", "cat", or the like or the degree of matching with an object image registered in advance. Object recognition includes, for example, a method of configuring discriminators for "dog", "cat", or the like according to a learning algorithm typified by neural networks.

Figure 10:
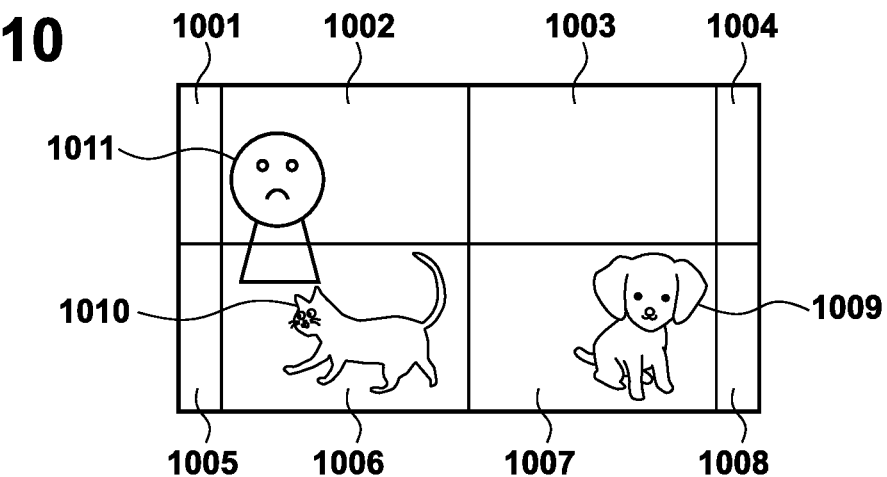
FIG. 10 is a diagram for describing object detection for each area in a captured image.

Level setting corresponding to object recognition information registered in advance will now be described with reference to FIG. 10. Here, a case in which images of three objects (1009, 1010, and 1011) are captured on the screen is described as an example. The object 1009 is determined to be a dog by object recognition, and the object 1010 is determined to be a cat. The object 1011 is a person, and, since a person is determined in the "importance level setting corresponding to person information", the person is an object excluded from targets of level setting corresponding to object recognition information. The level obtained when a "dog" is recognized and the level obtained when a "cat" is recognized are registered in advance, and, for example, a dog is an important object. In a case where a "cat" is defined as not being an important object, the level of an area 1007 in which a "dog" is detected is set higher than the level of an area 1006 in which a "cat" is detected. Furthermore, the reliability of object recognition can be obtained and the level can be changed according to the detected reliability.

Here, level setting is also performed according to a rate at which an object is captured. In an area in which the rate of the object image is large, the obtained importance level described above is directly set, and, in an area in which the rate of the object image is small, the level is changed according to the rate.

Importance Level Setting Corresponding to Scene

Determination of, for example, a "blue sky scene", a "natural verdure scene", and an "evening view scene" is performed by analyzing image data, and level setting is performed on the basis of such scene determination information. Furthermore, with regard to scene determination concerning the sky, since information about the tilt of the camera can be obtained from the absolute angle information of the camera, determination about the sky, such as a "blue sky scene" and an "evening view scene", is performed in an image present in a region upward from the direction perpendicular to the direction of gravitational force.

First, 12-bit RAW data of a captured one frame is divided into blocks including n×m (n and m being integers) regions, and average values of pixels of respective colors R, G, and B in each divided region are calculated. Temporary development processing including white balance correction processing, gamma correction processing, and color conversion matrix processing is performed on the R, G, and B average values of each block.

Determination of a "blue sky scene" is performed by calculating the rate of blue sky blocks in an upper region in the screen. Determination of whether or not it is a blue sky block is performed by defining a blue sky determination region on the UV color space and counting blocks within the blue sky determination region.

Determination of an "evening view scene" is performed by calculating the rate of evening view blocks in an upper region in the screen. Determination of whether or not it is an evening view block is performed by defining an evening view determination region on the UV color space and counting blocks within the evening view determination region.

Determination of a "natural verdure scene" is performed by detecting the rate of natural verdure blocks to all of the blocks in the screen. Determination of whether or not it is a natural verdure block is performed by defining a natural verdure determination region on the UV color space and counting blocks within the natural verdure determination region.

Figure 11:
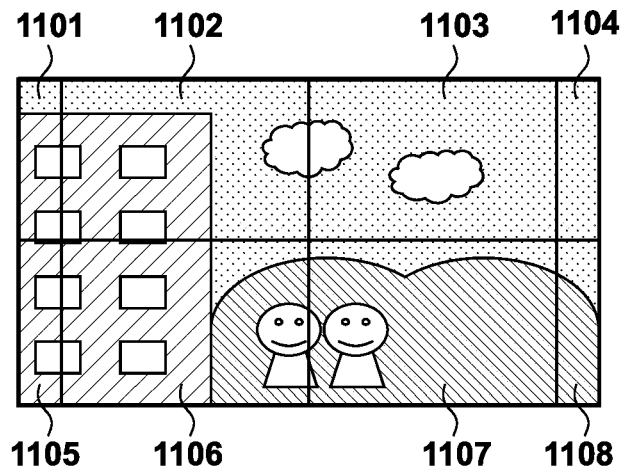
FIG. 11 is a diagram for describing scene detection for each area in a captured image.

Setting of the importance level corresponding to scene detection information will now be described with reference to FIG. 11.

The scene in this example shows a blue sky in an upper right area of the screen, a building in a left area of the screen, and natural verdure in a lower right area of the screen. A "blue sky scene" and a "natural verdure scene" are detected by performing scene determination in the screen, and the level corresponding to the blue sky region recognition is set in an area 1103 and the level corresponding to the natural verdure region recognition is set in an area 1107. With respect to an area 1102, since about 40% of the area is a blue sky region, the level corresponding to the blue sky region recognition is set to 40%. With respect to an area 1106, since about 30% of the area is a natural verdure region, the level corresponding to the blue sky region recognition is set to 30%.

While the scene determination method using color space information has been described above, a method of determining a scene using luminance values may also be used. Using "night view scene" determination as an example, a case in which objects with only levels extremely high in luminance and levels extremely low in luminance are distributed in a histogram of the entire screen is determined to correspond to a night view. Furthermore, a point light source can be determined using contrast evaluation based on high-frequency components of a luminance signal of an image, and a "night view scene" can be determined using a luminance distribution and a result of detection of the point light source.

The respective importance levels in a "blue sky scene", an "evening view scene", a "natural verdure scene", and a "night view scene" are registered in advance, and setting of the importance level corresponding to a scene is performed for each area according to the registered importance levels.

Importance Level Setting Corresponding to Speech Information

Determination of, for example, a "speech direction" a "sound level (speech level)", and a "speech recognition" is performed by analyzing speech information data, and setting of the importance level on the basis of the speech information is performed.

Figure 12A:
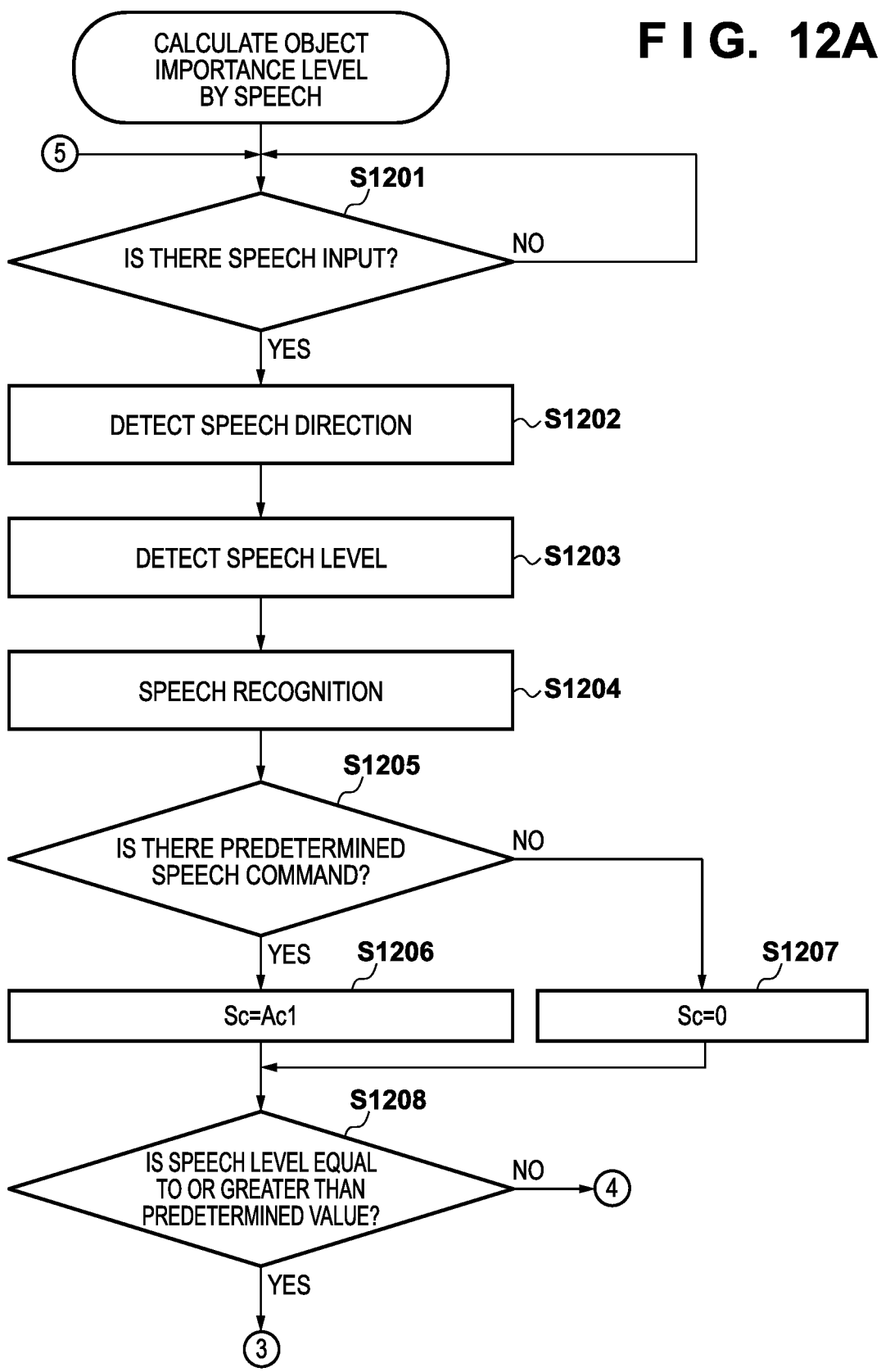
FIG. 12A is a flowchart for describing speech detection.
Figure 12B:
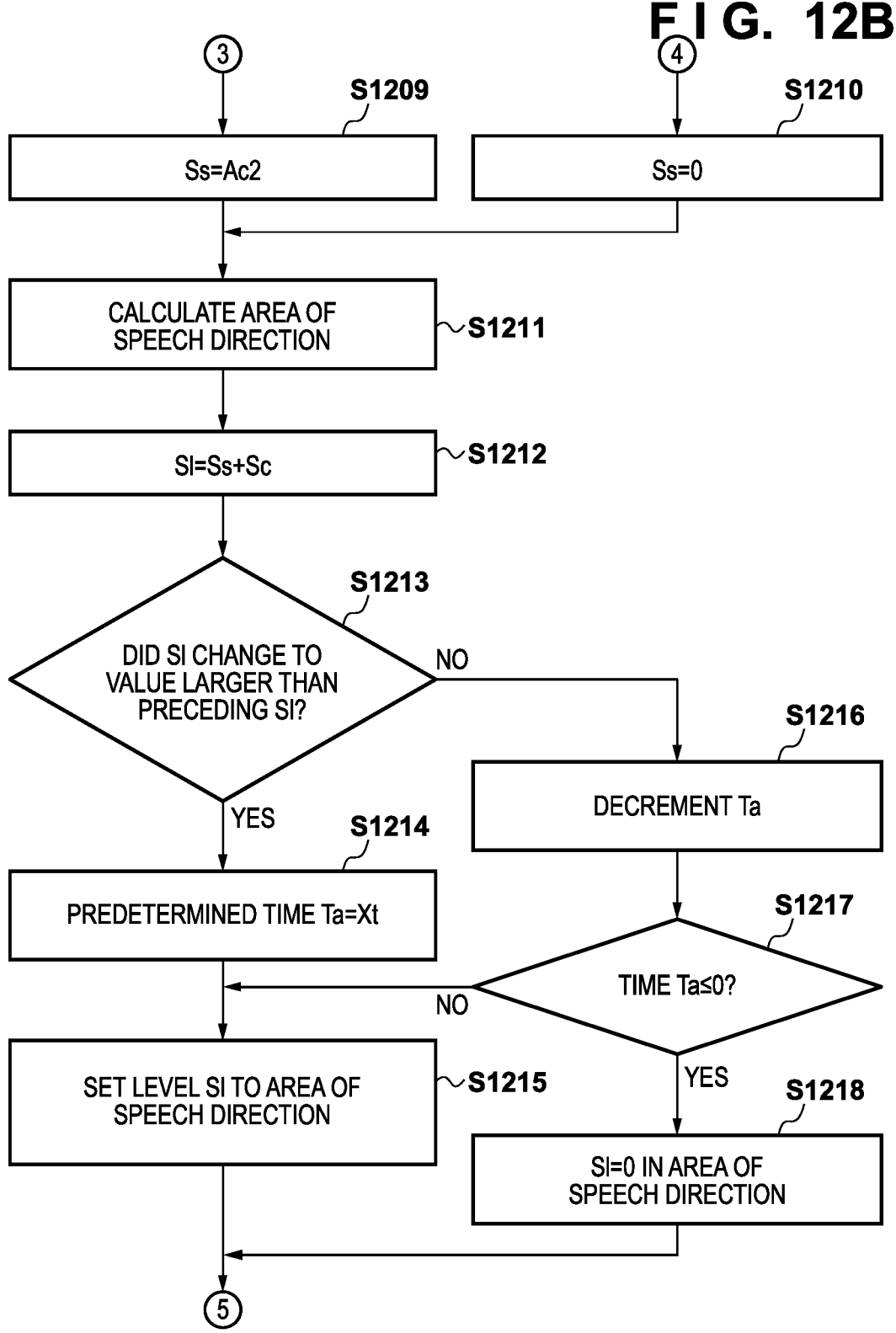
FIG. 12B is a flowchart for describing speech detection.

Setting of the importance level corresponding to speech information will now be described with reference to the flowchart of FIGS. 12A and 12B.

In step S1201, the speech acquisition unit of the control unit 215 determines whether or not audio of speech from the outside has been acquired. In a case where speech has been acquired, the process proceeds to step S1202. In a case where speech has not been acquired, the process returns to step S1201.

In step S1202, the speech direction detection unit of the control unit 215 detects the direction of the origin of the acquired speech. In step S1203, the sound level is detected. In step S1204, the speech recognition unit of the control unit 215 recognizes the acquired speech.

In step S215, it is determined whether or not the recognized speech is a specific speech command. In a case where it is a speech command, the process proceeds to S1206 and the speech recognition level Sc is set to Ac1. In a case where it is not a speech command, the process proceeds to Step S1207 and the speech recognition level Sc is set to 0.

In step S1208, it is determined whether or not the detect sound level equal to or greater than a predetermined value. In a case where the sound level is equal to or greater than the predetermined value, the process proceeds to step S1209 and the speech level Ss is set to Ac2. In a case where the sound level is less than the predetermined value, the process proceeds to step S1210 and the speech level Ss is set to 0.

In step S1211, the sound direction area corresponding to FIGS. 6A to 6D is calculated from the direction of the origin of the speech detected in step S1202. For example, in view of a speech direction recognition error, all of the area ±45 degrees from the angle of the determined direction is determined as the sound direction area.

Next, in step S1212, the speech recognition level Sc and the speech level Ss are added together to calculate a total sound level Sl, and then the process proceeds to step S1213.

In step S1213, whether or not the total sound level Sl has changed to a value larger than the total sound level Sl obtained at the preceding sampling. In a case where the value has changed to a larger value, the process proceeds to step S1214, a time count Xt is set to a predetermined time parameter Ta, and the process proceeds to step S1215. In step S1215, the level Sl is set to the area set in step S1211, and then the process returns to step S1201.

In a case where is determined in step S1213 that the total sound level Sl has changed to an equal or smaller value than the total sound level Sl obtained at the preceding sampling, the process proceeds to step S1216, the predetermined time parameter Ta is decremented, and then process proceeds to step S1217.

In step S1217, whether or not the time Ta is equal to or less than 0 is determined. In a case where it is equal to or less than 0 (a case where Ta has elapsed since the total sound level Sl changed to a smaller value), in step S1218, the total sound level Sl is set to 0, and the total sound level Sl of the area set in step S1211 is set to 0. In a case where, in step S1217, the time Ta is greater than 0, the process proceeds to step S1215, and the total sound level Sl calculated up until now is set as the importance level corresponding to the speech information in the area of the speech direction.

Importance Level Setting Corresponding to Image Motion Information

Setting of the importance level corresponding to image motion information is performed by determining whether or not a motion object is present in each area obtained by the area division performed as illustrated in FIGS. 6A to 6D.

Detection of a difference between frames or detection of a motion vector between frames is performed for each area. The method of detecting a motion vector includes dividing a screen into a plurality of regions, comparing an image stored in advance for the preceding frame and a current image (two successive images) with one another, and calculating an image motion amount from the information about relative shifts in the images.

Here, since the angle of the lens barrel (in the direction of the optical axis of the imaging plane) can be obtained from differences between the absolute angle of the image capturing apparatus and the rotational positions of the tilt rotation unit 104 and the pan rotation unit 105, a motion vector value affected by a change in camera angle can be detected from a difference in the lens barrel angle between frames.

Figure 13A:
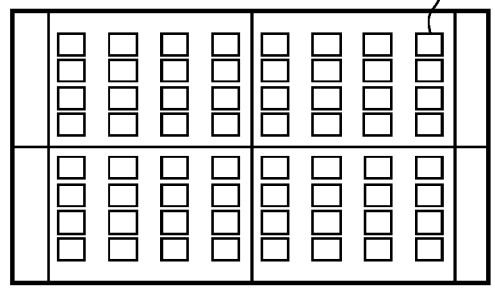
FIG. 13A is a diagram for describing motion detection in a captured image.

Movement pixels between frames are detected in regions 1301 obtained by further dividing each area as illustrated in FIG. 13A, and frequency distribution processing is performed on the basis of vector signals obtained by subtracting the motion vector value affected by a change in camera angle from the detected movement pixels. Note that in a case where it is difficult to detect vectors, such as in the case of low contrast, vector information in a block in which detection of vectors is impossible is not reflected in the frequency distribution processing.

Figure 13B:
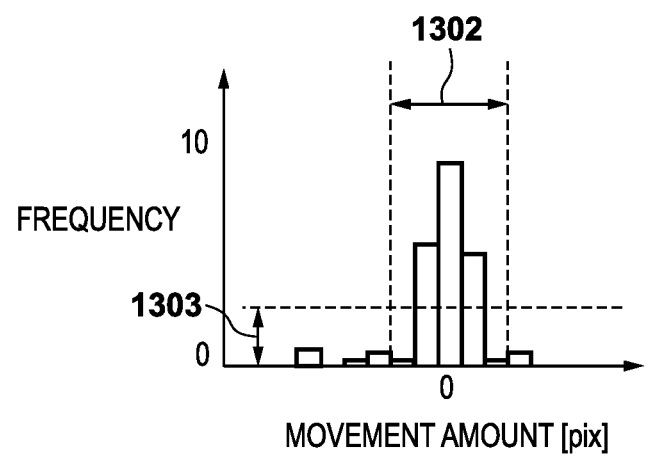
FIG. 13B is a diagram for describing motion detection in a captured image.
Figure 13C:
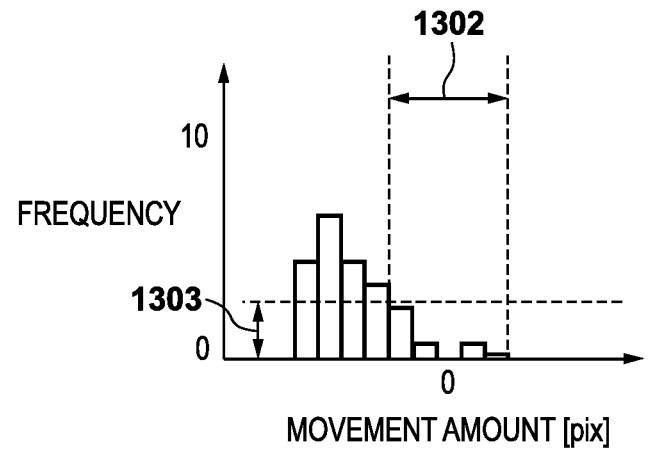
FIG. 13C is a diagram for describing motion detection in a captured image.

Frequency distribution examples are illustrated in FIGS. 13B and 13C. FIG. 13B illustrates a frequency distribution example in a certain frame in a case where no motion object is present in a certain area. Since the range of a threshold value 1302 is a vector range in which vector values are small and there is little motion, vector information obtained in the range of the threshold value 1302 is not used. In a case where movement amounts other than the threshold value 1302 exceed a frequency threshold value 1303, it is determined that a motion object is present in the area. In the case of FIG. 13B, the movement amounts other than the threshold value 1302 do not exceed the frequency threshold value 1303, and thus it is determined that no motion object is present. FIG. 13C illustrates a frequency distribution example in a certain frame in a case where a motion object is not present in an area. Since vector movement amounts outside the range of the threshold value 1302 exceed the frequency threshold value 1303, it is determined that a motion object is present in the area. When it is determined that a motion object continues being present during a plurality of past frames, an importance level with for a present motion object is set.

Level Setting Corresponding to Past Image Capture Information

Setting of the importance level is performed on the basis of information about past image captures.

The camera is configured to perform driving for panning and tilting to carry out automatic object search according to a method described below. When the camera detects an automatic image capture trigger from image information during a search, automatic image capture is performed. For example, the automatic image capture trigger can be detection of a person's facial expression such as smile or can be the magnitude of the final importance level of an object which is described below. Furthermore, the operator can operate a release switch SW provided on the camera to manually capture an image. When a camera captures an image, the past image capture information is stored and managed.

First, setting the level corresponding to past image capture information for each area will be described.

In each area obtained by area division performed as illustrated in FIGS. 6A to 6D, the number of images captured in each area is stored and managed. A method of past management in each area is illustrated in FIG. 14, with the number of images captured being managed in terms of area along the vertical axis and in terms of time along the horizontal axis. Setting of the importance level for each area is performed on the basis of the past information in each area such as that illustrated in FIG. 14. "Present time to Time T1" indicates the number of images captured in a period from the present time to the past time T1, and a weighting coefficient thereof is 1, for example. "Time T1 to Time T2" indicates the number of images captured in a period from the past time T1 to the past time T2, and a weighting coefficient thereof is 0.8, for example. "Time T2 to Time T3" indicates the number of images captured in a period from the past time T2 to the past time T3, and a weighting coefficient thereof is 0.5, for example. "Time T3 to Time T4" indicates the number of images captured in a period from the past time T3 to the past time T4, and a weighting coefficient thereof is 0.2, for example.

The numbers of captured images are multiplied by the respective weighting coefficients and the results of multiplication in the respective periods are added together, so that the weighted total number of captured images in each area is calculated.

The total number of captured images in Area 1 corresponds to 0×1+0×0.8+0×0.5+2×0.2=0.4 images, and the total number of captured images in Area 3 corresponds to 3×1+4×0.8+2×0.5+0×0.2=7.2 images.

Level setting corresponding to past image capture information for each area is performed by multiplying the total number of captured images in each area by a level coefficient (the level coefficient being a minus value and being set in such a way as to decrease the importance level as the number of shots increases).

Also, the past image capture information is fed back to, for example, "importance level setting corresponding to person information", "importance level setting corresponding to object recognition information", "importance level setting corresponding to scene", and the like and also has an effect on each level setting.

FIG. 15 is a table for managing past image capture information for feedback to "importance level setting corresponding to person information". The number of past captured images for each object registered as personal registration (Asan, Bsan, Csan, Dsan, . . . ) is stored and managed. As with the method described with reference to FIG. 14, a weighting coefficient is set in each period, and the total number of captured images is calculated for each registered object. A result obtained by multiplying the total number of captured images by a level coefficient for level setting (the coefficient being a minus value and is set in such a way as to decrease the level as the number of captured images increases) is added to the gain Ka. In this manner, the past image capture information is fed back to "importance level setting corresponding to person information". Note that the gain Ka is set in such a manner as not to become equal to or less than 0.

FIG. 16 is a table for managing past image capture information for feedback to "importance level setting corresponding to object recognition information". The number of past captured images for each object registered (dog, cat, . . . ) is stored and managed. As with the method described with reference to FIG. 14, a weighting coefficient is set in each period, and the total number of captured images is calculated for each registered object. A result obtained by multiplying the total number of captured images by a level coefficient for level setting (the coefficient being a minus value and is set in such a way as to decrease the level as the number of captured images increases) is added to the level setting corresponding to each object. In this manner, the past image capture information is fed back to "importance level setting corresponding to object recognition information". Note that the importance level corresponding to each object is set in such a manner as not to become equal to or less than 0.

FIG. 17 is a table for managing past image capture information for feedback to "importance level setting corresponding to scene". The number of past captured images for each scene blue sky, evening view, natural verdure, night view, . . . ) is stored and managed. As with the method described with reference to FIG. 14, a weighting coefficient is set in each period, and the total number of captured images is calculated for each registered object. A result obtained by multiplying the total number of captured images by a level coefficient for level setting (the coefficient being a minus value and is set in such a way as to decrease the level as the number of captured images increases) is added to the level setting corresponding to each scene. In this manner, the past image capture information is fed back to "importance level setting corresponding to scene". Note that the importance level corresponding to each scene is set in such a manner as not to become equal to or less than 0.

Importance Level Setting Corresponding to Unsearched Time

Figure 18:
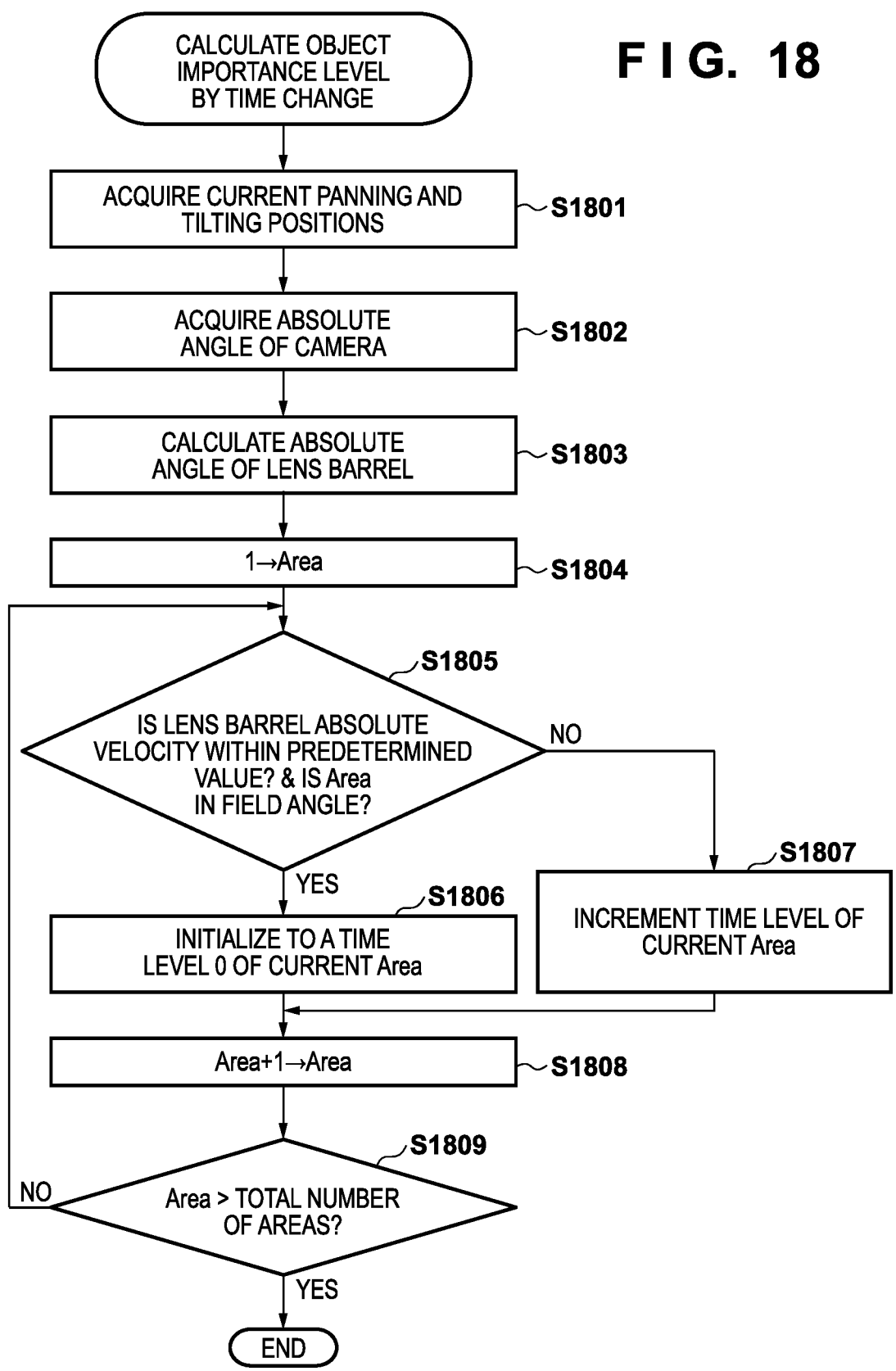
FIG. 18 is a flowchart for describing the calculations using search elapsed time.

Setting of the importance level corresponding to the elapsed time from the last search at each area position obtained by area division as illustrated in FIGS. 6A to 6D. The processing flowchart is illustrated in FIG. 18.

When the processing starts in step S1801, the current panning and tilting positions are acquired, and the process then proceeds to step S1802.

In step S1802, the absolute angle of the image capturing apparatus calculated by the method described above with reference to FIGS. 5A and 5B is acquired, and the process then proceeds to step S1803. In step S1803, the absolute angle of the lens barrel 102 is calculated from the panning and tilting positions acquired in step S1801 and the absolute angle of the image capturing apparatus acquired in step S1802, and the process then proceeds to step S1804.

In step S1804, "1" is substituted in for "Area", which is a variable for loop computation, and the process then proceeds to step S1805.

In step S1805, whether or not the absolute angular velocity calculated by performing differential processing on the absolute angle of the lens barrel 102 is within a predetermined velocity is determined, and, with area numbers defined in the respective areas obtained by division performed as illustrated in FIGS. 6A to 6D, whether or not the variable Area corresponds to an area number of one in the field angle is determined. In a case where it is determined that the Area is in the field angle and the lens barrel absolute angular velocity is such a velocity as to allow detection of each object (an angular velocity according to which a delay time until an object is detected from an image is within a predetermined value in view of an imaging delay and a detection time delay), the process proceeds to step S1806.

In step S1806, the importance level corresponding to an unsearched time of the current Area is set to 0, and the process then proceeds to step S1808.

If, in step S1805, it is determined that the current Area corresponds to no area included in the field angle or the lens barrel absolute angular velocity is greater than the predetermined angular velocity, the process proceeds to step S1807, the time level of the current Area is incremented, and the process then proceeds to step S1808.

In step S1808, the Area is incremented, and the process then proceeds to step S1809. Then, whether or not the Area is greater than the total number of areas is determined, and, if it is determined that the Area is greater than the total number of areas, the process ends. If it is determined that the Area is less than the total number of areas, the process returns to step S1805, so that the process of steps S1805 to S1809 can be repeated.

In the above-described method, the importance level corresponding to an unsearched time is set for each area, and the time level of each area becomes greater according to the elapsed time from when searching for an object is last performed in an area (the unsearched time of an area). In this manner, if there is an area in which searching has not been performed for a long time, the importance level of the area is increased, so that searching in the area is started with panning and tilting.

Importance Level Setting Corresponding to Camera Vibration State

Setting of the importance level according to the vibration state of the camera is performed.

A vibration state of the camera (a vehicle movement state, a placement shooting state, or a hand-held state) is determined from a result of determination of the camera state calculated in step S308.

In a case where the camera vibration state is the "placement shooting state", since the computation of the absolute angle of the image capturing apparatus is not performed incorrectly and the reliability of computation of the importance level for each area is high, the importance level of an object in each area computed up to this time is used directly in performing the subsequent search control.

In a case where the camera vibration state is the "vehicle movement state", since the movement speed is high, while there is little change in the area of a person sitting in the vehicle, an object such as the landscape changes from moment to moment. Thus, in the case of the vehicle movement state, the importance level of "importance level setting corresponding to person information" is used directly, but the importance level of "importance level setting corresponding to image motion information" is not used. Also, since the "importance level setting corresponding to scene" and the "importance level setting corresponding to object recognition information" is highly likely to change quickly, the importance level is lowered. However, in an automatic image capture, for example, a method of immediately performing image capture upon detection can be contrived. In "importance level setting corresponding to speech information" and "level setting corresponding to past image capture information", the importance level is used directly. Furthermore, a computation may be performed to, for example, detect the advancement direction of the camera moving at high speeds with, for example, an acceleration sensor, and raise the importance level of an area located in the advancement direction.

In a case where the vibration state of the camera is the "hand-held state" (the state in which blur vibration is large), the operator is likely to operate the direction of the camera. Thus, in areas in the range of ±45 degrees from the camera normal position (in which the tilting angle and the panning angle are 0 degrees), the importance level is raised, and in areas in the range of from ±45 degrees to ±90 degrees, the importance level is lowered. Also, in areas further out from ±90 degrees, the importance level is lowered even further. In this manner the importance level of each area is set. A method of adding together the importance levels of each area or a method of weighting the importance level calculated for each area according to the range may be used. For example, the weighting coefficient may be set to 1 in areas in the range of ±45 degrees, the weighting coefficient may be set to 1 or less in areas in the range of from ±45 degrees to ±90 degrees, and the weighting coefficient may be set to an even lower value in areas further out from ±90 degrees.

According to the above-described method, according to the camera vibration state, the computations of the importance level are changed, allowing for an object search suitable to the vibration state to be performed.

The "importance level corresponding to person information", "importance level corresponding to object recognition information", "importance level corresponding to scene", "importance level corresponding to speech information", "importance level setting corresponding to image motion information", "importance level corresponding to past image capture information", and "importance level corresponding to unsearched time" for each area obtained by the method described above are added together, the object importance level is calculated, and the process proceeds to step S313. Note that in a case where an object with an object importance level equal to or greater than a predetermined threshold value is detected, tracking determination is performed, and the threshold value for tracking and searching is changed to make tracking easier.

In step S313, a target angle for panning and tilting search is calculated from the object importance level for each area, and the process then proceeds to step S314. The target angles for panning and tilting search are calculated by the following method.

Figures 19A, 19B:
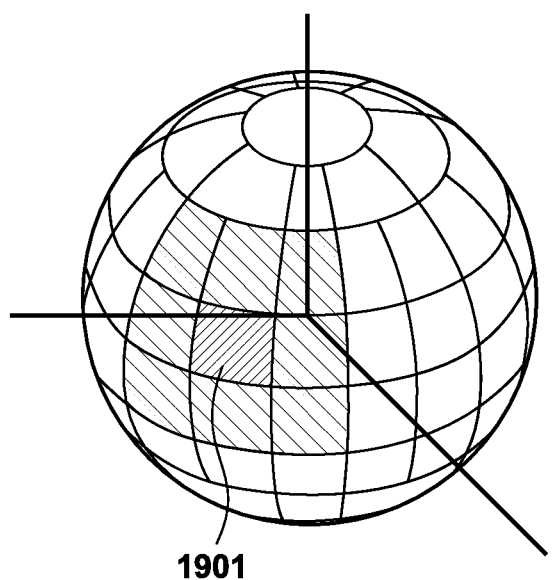
FIG. 19A is a diagram for describing search target angle calculations for each scene.
FIG. 19B is a diagram for describing search target angle calculations for each scene.

First, a searching final level is calculated from the object importance levels in areas adjacent to each area. The searching final level in an area 1901 illustrated in FIG. 19A is computed using information about the area 1901 and its surrounding areas (1902, 1903, 1904, 1905, 1906, 1907, 1908, and 1909). Then, the weighting coefficient of the area 1901 is set to 1, the weighting coefficients of the other areas are set to 1 or less (for example, 0.5), the object importance levels of the respective areas are multiplied by the associated weighting coefficients, the calculated values obtained in all of the areas are added together to calculate the searching final level. This computation is performed for all of the areas, and thus the searching final level in each area is calculated. Next, the area with the largest searching final level is set as a search target area. In a case where the search target area is the area 1901 illustrated in FIGS. 19A and 19B, panning and tilting search target angles are calculated from the searching final levels of the areas 1901 to 1909 and the center angles of the areas 1901 to 1909 according to Formula (5).

[Math. 1]

$$y = \sum_{i=1}^{n}\left(b_i \times \frac{a_i}{\sum_{k=1}^{n} a_k}\right) \quad (5)$$

In Formula 1, n is the number 9 of the areas 1901 to 1909, i is a variable defining the areas 1901 to 1909 as 1 to 9, b is the center angle of each area, and a is the searching final level of each area. The panning and tilting search target angles can be calculated by computing the position y of the center of gravity of an angle which is based on the searching final levels computed between the areas 1901 to 1909 (y being computed in each of the tilting direction and the panning direction).

Note that in a case where all of the values of the searching final levels in the respective areas are equal to or less than a predetermined threshold value, since it is determined that there is no important object at that time even when the areas are searched, panning and tilting driving is not performed.

At this time, the target angle is calculated on the basis of the object importance level calculated excluding "level setting corresponding to past image capture information". Then, after performing panning and tilting driving to the target angles, the camera is held at that angle position until any one of the searching final levels of the respective areas becomes greater than the predetermined threshold value. In this manner, the panning and tilting search target angles are calculated.

Next, a second rotational correction amount for tracking is calculated, and the process then proceeds to step S314.

Figure 20A:
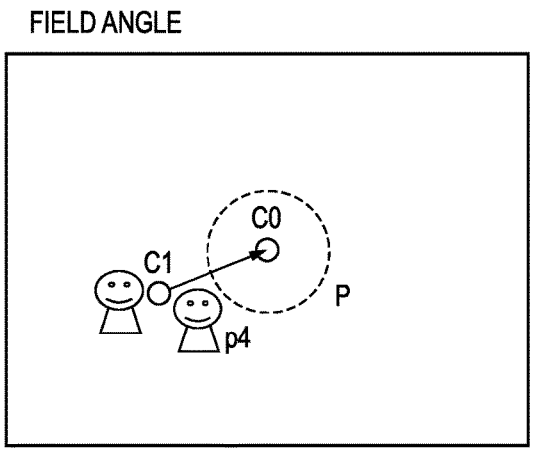
FIG. 20A is a diagram illustrating an example of the position in an image of an object detected by a camera and a method of setting a threshold value for tracking and searching and a second rotation correction amount.
Figure 20B:
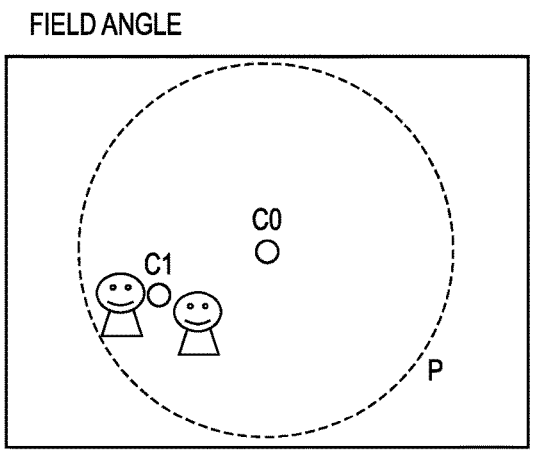
FIG. 20B is a diagram illustrating an example of the position in an image of an object detected by a camera and a method of setting a threshold value for tracking and searching and a second rotation correction amount.

FIGS. 20A and 20B are diagrams illustrating an example of the position in an image of an object detected by the camera and a method of setting a threshold value for tracking and searching and a second rotation correction amount.

C0 is the tracking target position in the captured image (field angle), C1 is the center position of the object region in the captured image, a circle P with C0 as the center is a tracking target region, and the radius of the circle P is a threshold value for determining whether or not to perform tracking and searching. In a case where the object tracking remainder (distance in the captured image between C1 and C0) is greater than the threshold value for tracking and searching, tracking is performing by the rotation mechanism to move C1 closer to the position of C0.

When the panning and tilting rotational correction amount (Dp, Dt) for tracking is calculated, the difference between the coordinates of C0 (x0, y0) and the coordinates of C1 (x1, y1) are obtained, and the difference is multiplied by the conversion coefficient for panning and tilting to obtain the drive amount. The panning conversion coefficient is represented by kp, the tilting conversion coefficient is represented by kt, and the panning rotational correction amount Dp and the tilting rotational correction amount Dt are represented by the following formulas.

$$Dp = (x1 - x0) \times kp \quad (6)$$

$$Dt = (y1 - y0) \times kt \quad (7)$$

In Formulas (6) and (7), the conversion coefficients kp and kt are for converting a positional error in the image to a panning and tilting target location difference and thus change depending on the size of the image sensor, the focal length, and the detection resolution of the panning and tilting position detection unit.

In step S314, the panning and tilting drive amount is calculated from the image blur correction amount obtained in step S306, the panning and tilting search target angle obtained by step S313, and the rotational correction amount for tracking. The panning and tilting driving amounts (both the driving angle for panning and the driving angle for tilting) are calculated by adding the image blur correction amount, the rotational correction amounts for tracking, and the driving angle used for control sampling which is based on the panning and tilting search target angles, and the process then proceeds to step S315.

Figure 21:
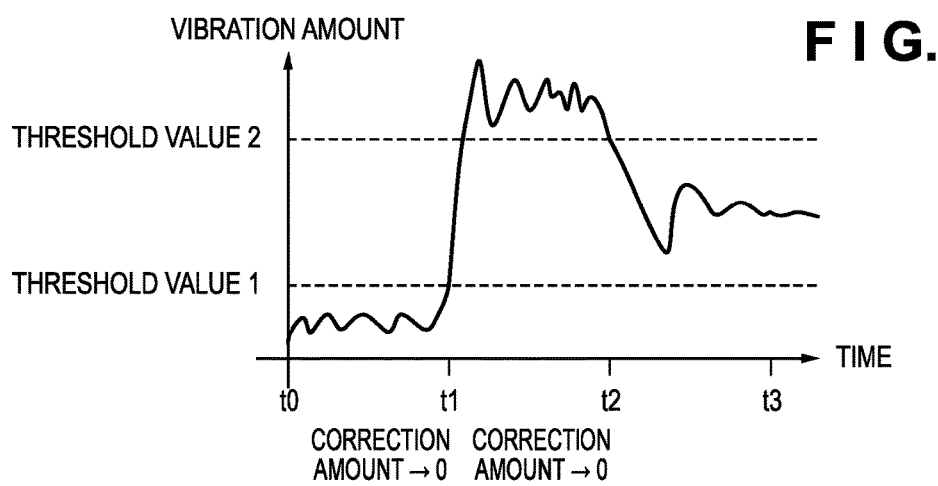
FIG. 21 is a diagram illustrating an example of change in a time series of the vibration amount detected by a camera and a method of setting a first and second threshold value for image blur correction and a first rotational correction amount.

FIG. 21 is a diagram illustrating an example of change in a time series of the vibration amount detected by the camera and a method of setting the first and second threshold value for image blur correction and a first rotational correction amount. The threshold value 1 in FIG. 21 is the first threshold value for image blur correction relating to the vibration amount for determining whether or not the camera is in a placement shooting state and is measured and stored in the camera in advance. In a case where the camera is in a placement shooting state, the need to operate that rotation function for image blur correction is low. If the detected vibration amount is less than the threshold value 1 (as in time t0 to time t1 in FIG. 21), the camera is determined to be in a placement shooting state and the first rotational correction amount for image blur correction is set to 0 (zero).

The threshold value 2 in FIG. 21 is the second threshold value for image blur correction relating to the vibration amount for determining whether or not the camera is in a range where image blur correction is possible and is measured and stored in the camera in advance. In a case where the vibration amount is greater than the upper limit of a range where camera image blur correction is possible, since image blur equal to or greater than the upper limit of the range cannot be corrected even when image blur correction operations are performed, it is preferable not to perform image blur correction operations from the perspective of the effect of image blur correction versus power consumption. For the camera, if the detected vibration amount is equal to or greater than the threshold value 2 in FIG. 21 (as in time t1 to time t2 in FIG. 21), the first rotational correction amount for image blur correction is set to 0.

For the camera, if the detected vibration amount is equal to or greater than the threshold value 1 in FIG. 21 but less than the threshold value 2 in FIG. 21 (as in time t2 to time t3 in FIG. 21), the first rotational correction amount for image blur correction is kept at the same value calculated by step S314.

FIG. 20A is a diagram illustrating an example of an object with a high image capture importance present in the field angle. The range of the tracking target region is narrowly set corresponding to the importance, the value calculated by step S314 for the second rotational correction amount for making C1 not in the tracking target region being continuously captured at the position of C0 is kept the same value, and tracking using rotational drive is continued.

FIG. 20B is a diagram illustrating an example of an object with a low image capture importance present in the field angle. The range of the tracking target region is widely set corresponding to the importance, and because C1 is in the tracking target region, the second rotational correction amount for tracking and searching is set to 0, and tracking using rotational drive is not performed.

In a case where the object is not present in the field angle, the second rotational correction amount for tracking and searching is set to 0, and tracking using rotational drive is not performed.

Also, the rotational correction amount of when there is an instruction for rotation via a user operation is defined as the third rotational correction amount. When panning and tilting rotation is performed in response to a user operation, it is preferable that the power supply to rotation mechanisms unnecessary for the rotation are turned off (the rotation mechanisms are stopped) from the perspective of power saving. Here, a user operation includes "instruction via an external device operation", "speech instruction", and "gesture instruction". "Instruction via an external device operation" is an instruction transmitted from a not-illustrated external device via the communication unit 213. When an instruction from a user operating the external device is received, the rotation mechanism can be rotated in the instructed direction. Also, "speech instruction" is an instruction via speech input from the speech input unit 210. The direction of the origin of the speech can be detected, and the rotation mechanism can be rotated in that direction. Also, "gesture instruction" is an instruction via a gesture operation that has a specific meaning by a person from among the objects in the image captured by the image capturing unit in step S312. When this is detected, the rotation mechanism is rotated on the basis of the gesture. When a rotation instruction is performed via a user operation, the power supply to the rotation unit of an axis not required for the rotation can be turned off. In a case where, as the rotation instruction via a user operation, the operation amount in the panning or tilting direction is zero, the third rotational correction amount by the user operation is set to 0, and rotational drive is not performed.

Here, in the present embodiment, in a case where the threshold value (threshold value for the user operation) of the operation amount of the user operation relating to whether or not to rotate according to a user operation is zero, in other words there has been a user operation, the rotational correction amount is calculated each time. However, in a case where a small operation amount of a user operation is detected, a threshold value for providing a deadband may be set so that the third rotational correction amount is set to 0.

In this manner, by setting the first to third rotational correction amounts, in a case where any one of the first to third rotation amounts is less than the respective threshold value set for the first to third rotation amounts, the power supply to the rotation mechanism can be turned off.

In step S315, the threshold value for determining whether to turn off the power supply for any of the panning or tilting axes is calculated using the image capture conditions and shooting mode set by the user and the camera state detected inside the image capturing apparatus, and the process the proceeds to step S316.

Here, the image capture conditions set by the user include "image blur correction strength setting", "tracking strength setting", "search strength setting", "automatic image capture frequency setting", "shutter speed setting", and "power saving setting", and the threshold values for image blur correction and tracking and searching change depending on the image capture conditions.

For example, in a case where the "image blur correction strength setting" is set to "low", the first threshold value for image blur correction is changed upward to make it easier for power supply to be turned off. In a case where the "tracking strength setting" is set to "low", the threshold value for tracking and searching is changed upward to make it easier for power supply to be turned off. In a case where the "search strength setting" is set to "low", the threshold value for tracking and searching is changed upward to make it easier for power supply to be turned off. In a case where the "automatic image capture frequency setting" is set to "low", the first threshold value for image blur correction and the threshold value for tracking and searching are changed upward. In a case where the "shutter speed setting" is set to a higher speed than the hand shake threshold value, since the image blur correction effect is minimal, the first threshold value for image blur correction is changed upward. In a case where the "power saving setting" is set to "on", the first threshold value for image blur correction, the threshold value for tracking and searching, and the threshold value for the user operation are changed upward.

Also, the shooting mode set by the user includes "panorama shooting mode", "time-lapse shooting mode", "tracking shooting mode", and "first person shooting mode", and the threshold value changes depending on the operations of the set shooting mode.

For example, in the "panorama shooting mode", a predetermined number of images are captured while rotating the pan and tilt in the horizontal and vertical direction by a predetermined rotation angle and the captured images are connected and combined as a still image. When a user instruction via an external device operation is received and the field angle is changed in the horizontal or vertical direction by a predetermined rotation angle, power supply of the rotation unit of an axis not required for rotation can be turned to off. The threshold value for user operation is changed in a direction that makes it easier to turn off the power supply of the rotation mechanisms not required for rotation.

In the "time-lapse shooting mode", a moving image is created from a plurality of images captured while rotating from a start position of panning and tilting to an end position at a predetermined angle and changing the field angle. When a user instruction via an external device operation is received and the shooting direction is changed for the horizontal direction and the vertical direction between the instructed start angle and the end angle, power supply of the rotation unit of an axis not required for rotation can be turned to off. The threshold value for user operation is changed in a direction that makes it easier to turn off the power supply of the rotation mechanisms not required for rotation.

In the "tracking shooting mode", a moving object is tracked while rotating the pan and tilt to capture an image. When a user instruction via an external device operation is received and the instructed object is tracked, power supply of the rotation unit of an axis not required for rotation can be turned to off. The threshold value for user operation is changed in a direction that makes it easier to turn off the power supply of the rotation mechanisms not required for rotation. When the object to be tracked is specified and tracked, the threshold value for tracking and searching is changed downward so that necessary tracking is performed. However, in a case where an object to be tracked is not instructed or the instructed object is no longer present, the threshold value for tracking and searching is changed upward to make it easier for power supply to be turned off.

Here, in the "panorama shooting mode", "time-lapse shooting mode", and "tracking shooting mode", when the camera vibration state is determined to be the placement shooting state in step S308, image blur correction operations are unnecessary, and thus the first threshold value for image blur correction is changed upward. In this manner, power supply to the rotation unit is easier to turn off. On the other hand, when the camera vibration state is not determined to be the placement shooting state, vibrations are caused by the camera being hand-held or the like. Thus, the first threshold value for image blur correction is left as is.

In "first person shooting mode", image capture is performed while rotating the pan and tilt so that the object moving on the screen can be followed. At this time, the power supply to the rotation unit of an axis not required for the rotation can be turned off. When a user instruction via an external device operation is received and the pan and tilt are rotated so that the instructed object or recognized main object can be followed, the threshold value for user operation is changed in a direction that makes it easier to turn off power supply to a rotation mechanism not required for rotation. When the object to be followed is specified and tracked, the threshold value for tracking and searching is changed downward so that tracking rotation operations at the necessary speeds are performed. However, in a case where an object is not instructed or the object being followed is no longer present, the threshold value for tracking and searching is changed upward to make it easier for power supply to be turned off.

Also, the camera states detected inside the image capturing apparatus include the "image capture scene determination", "remaining battery level", "total number of captured images or total shooting time within a predetermined amount of time", "focal length", "object luminance", and "captured image transfer state", and the power supply to the rotation mechanism can be turned off depending on the camera state.

For example, in the "image capture scene determination", in a case where it is determined to be an important image capture scene, so that the object can be reliably captured without blur, the first threshold value for image blur correction is changed downward so that the power supply to the pan and tilt drive motor can easily be turned to on. In the other case, the first threshold value for image blur correction is changed upward so that the power supply can easily be turned to off. In a similar manner, in a case where it is determined to be an important image capture scene, the threshold value for tracking and searching is changed downward so that tracking and searching of the object can be reliably performed. In the other case, the threshold value for tracking and searching is changed upward so that the power supply can be easily turned to off.

Here, the important image capture scene determination is performed by determining whether or not the scene currently being captured is an important image capture scene according to the person information recognized by the camera, the object recognition information, the audio information, the image movement information, and the past image capture information.

In a case where the "remaining battery level" is less than a predetermined value, it is more likely that increasing the camera run time will achieve automatic image capture of an important object than turning on or off the image blur correction function. Thus, in a case where the remaining battery level is less than the predetermined value, the first threshold value for image blur correction is changed so that the power supply to the pan and tilt drive motor can be easily turned off. In a similar manner, the threshold value for tracking and searching is changed so that the power supply can be easily turned off.

In a case where the "total number of captured images or total shooting time within a predetermined amount of time" is equal to or greater than a predetermined value, it can be assumed that an image of a desired object can be captured by automatic image capture up to that range. Thus, in a case where the remaining battery level is less than the predetermined value, the first threshold value for image blur correction is changed so that the power supply to the pan and tilt drive motor can be easily turned off. In a similar manner, the threshold value for tracking and searching is changed so that the power supply can be easily turned off.

In a case where the "focal length" is on the wide-angle side, it is highly likely that an image with minimal blur can be captured with the shutter speed, without driving pan and tilt to perform image blur correction. The threshold value for determining whether to turn the power supply off is changed greatly by a predetermined coefficient when the focal length of the lens barrel 102 is on the wide-angle side of a predetermined threshold value or at a wide-angle side corresponding to the focal length. In this manner, the first threshold value for image blur correction is changed so that the power supply to the pan and tilt drive motor can be easily turned off. In a similar manner, the threshold value for tracking and searching is changed so that the power supply can be easily turned off.

In a case where the "object luminance" is equal to or greater than a predetermined threshold value, an image with minimal object blur can be captured with the shutter speed, without driving pan and tilt to perform image blur correction. Thus, the threshold value for determining whether to turn the power supply off may be changed according to the luminance information of the image captured by the imaging capturing unit 205. For example, in a case where the luminance of the object is greater than a predetermined luminance, the first threshold value for image blur correction is changed so that the power supply to the pan and tilt drive motor can be easily turned off. In a similar manner, the threshold value for tracking and searching is changed so that the power supply can be easily turned off.

In step S316, the rotational correction amounts of the axes calculated in step S314 are again calculated on the basis of the vibration detection amount detected in the camera and the object importance, and the process then proceeds to step S317.

In a case where the vibration detection amount detected in the camera is small enough to result in a determination that the camera is in the placement shooting state, the need to operate the rotation function is low. Accordingly, in a case where the vibration amount corresponding to the placement shooting state is set in advance to the threshold value (threshold value 1 in FIG. 21) and the vibration amount detected in the image capturing apparatus 101 is less than the threshold value (in the period from time t0 to time t1 in FIG. 21) the first rotational correction amount for image blur correction is set to 0.

On the other hand, in a case where the vibration detection amount detected in the camera is very large amount and is a vibration amount that exceeds the upper limit of the range for the image capturing apparatus 101 to be able to perform image blur correction, even if image blur correction operations are made, object blue beyond the upper limit of the range cannot be suppressed. Thus, it is preferable not to perform image blur correction operations from the perspective of the effect of image blur correction versus power consumption. Here, the vibration amount corresponding to the upper limit for enabling image blur correction is set in advance to the threshold value (threshold value 2 in FIG. 21). Accordingly, in a case where the vibration amount detected in the image capturing apparatus 101 is greater than the set threshold value (in the period from time t1 to time t2 in FIG. 21) the first rotational correction amount for image blur correction is set to 0.

Also, in a case where an object is not detected in the image captured by the imaging capturing unit 205 or a case where the detected object has a low importance, it is preferable to not perform automatic tracking and image capture and not to operate the rotation mechanism from the perspective of running the system for a long time. Here, in a case where an object is not detected, the second rotational correction amount for tracking and searching is set to 0. On the other hand, in a case where an object is detected, the region (tracking target region) for determining what range from the field angle center to continuously capture the object is set to a narrow region when the object image capture importance is high (FIG. 20A) and is set to a wider region when the object image capture importance is low (FIG. 20B). Then, in a case where the centroid of the object region detected by the image capturing apparatus 101 is present in the tracking target region, the second rotational correction amount for tracking and searching is set to 0.

In step S317, the rotational correction amount calculated in step S315 and the threshold value for determining whether to turn the power supply off calculated in step S316 are compared, and, in a case where either rotational correction amount is less than a predetermined time threshold value, the power supply to the rotation mechanism of that axis is turned off, and the process then proceeds to step S318.

In step S318, the tilt rotation unit 104 and the pan rotation unit 105 are driven and controlled by the lens barrel rotation drive unit 212 in accordance with the driving angle for panning and tilting, and the process then proceeds to step S319.

In step S319, whether or not there has been an image capture instruction manually input via operation of the operation unit 211 is determined. In a case where there has been an image capture instruction, the process proceeds to step S322, image capture is started, a still image is acquired, and the captured image is recorded in the image recording unit 207. In step S319, in a case where there is not manual image capture instruction, the process proceeds to step S320, and automatic image capture determination processing is performed.

In the automatic image capture determination of step S320, in a case where the object importance level obtained by step S316 is greater than a predetermined value, automatically image capture operation on is determined. Also, even in a case where the object importance level is not greater than a predetermined value, automatic image capture determination can be performed using the degree of smile on the detected face, automatic image capture determination can be performed using the closeness in terms of distance between a plurality of detected faces, or automatic image capture determination can be performed if an object (for example, a dog or a cat) or a scene (for example, a blue sky, an evening view, a night view, or natural verdure) not previously captured is detected. In step S320, when automatic image capture determination is performed, the process then proceeds to step S321.

In step S321, in a case where the automatic image capture determination result is automatic image capture on, the process proceeds to step S322 and still image capture is performed. In step S321, in a case where automatic image capture off is determined, the process returns to step S302 and automatic object search and automatic image capture processing is repeated.

In step S322, after still image capture is performed, the process then proceeds to step S323. Then, using the object information from the point in time image capture was performed in step S310, management is performed of past image capture information such as past number of captured images of an important object information and schedule consumption rate calculated from the number of images captured per unit time and the target number of captured images. In a case where moving image are captured, management of past image capture information is performed in a similar manner. In the case of moving images, the past image capture information management is performed using image capture information such as object detection in the captured moving images.

In step S323, when the past image capture information is updated, the process returns to step S302 and automatic object search and automatic image capture processing is repeated.

As described above, according to the embodiments described above, an image capturing apparatus can be provided that in configured to, in a case where image blur correction driving is not necessary, appropriately turn off the image blur correction operations, allowing for automatic image capture to be performed for a long time.

According to the present invention, power consumption can be greatly reduced in an image capturing apparatus that performs image blur correction using pan and tilt functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:
an image capture device configured to capture an object image;
a rotation device capable of rotating the image capture device; and
at least one processor or circuit configured to function as:
a first calculation unit configured to calculate a first rotation amount of the rotation device for correcting image blur based on shaking of the image capturing apparatus;
a second calculation unit configured to calculate a second rotation amount for searching for an object from an image captured by the image capture device; and
a stopping unit configured to stop the rotation device in a case where the first rotation amount and the second rotation amount are both less than threshold values respectively set for the first rotation amount and the second rotation amount,
wherein the second calculation unit, when tracking an object so as to keep it at a predetermined position within a screen, calculates a rotation amount of the rotation device to move the object to the predetermined position as the second rotation amount for the object existing outside a predetermined radius from the predetermined position and calculates the second rotation amount as zero for an object existing within the predetermined radius from the predetermined position, and changes the predetermined radius based on the importance level of the object.

2. The image capturing apparatus according to claim 1, wherein the first calculation unit sets the first rotation amount to zero in a case where a shake amount of the image capturing apparatus is less than a first threshold value.

3. The image capturing apparatus according to claim 2, wherein the first calculation unit sets the first rotation amount to zero in a case where a shake amount of the image capturing apparatus is greater than a second threshold value that is greater than the first threshold value.

4. The image capturing apparatus according to claim 2, wherein the first calculation unit changes the first threshold value depending on image capture conditions set by a user.

5. The image capturing apparatus according to claim 4, wherein the image capture conditions set by the user include at least one of image blur correction strength setting, tracking strength setting, automatic image capture frequency setting, shutter speed setting, or power saving setting.

6. The image capturing apparatus according to claim 2, wherein the first calculation unit changes the first threshold value depending on a state of the image capturing apparatus.

7. The image capturing apparatus according to claim 6, wherein the state of the image capturing apparatus includes at least one of image capture scene, remaining battery level, total number of captured images or total shooting time within a predetermined amount of time, focal length, object luminance, or captured image transfer state.

8. The image capturing apparatus according to claim 1, wherein the second calculation unit sets the second rotation amount on the basis of an importance of an object.

9. The image capturing apparatus according to claim 8, wherein the second calculation unit sets the second rotation amount to zero in a case where an importance of an object is less than a second threshold value.

10. The image capturing apparatus according to claim 9, wherein the second calculation unit changes the second threshold value depending on an importance of an object.

11. The image capturing apparatus according to claim 9, wherein the second calculation unit changes the second threshold value depending on image capture conditions set by a user.

12. The image capturing apparatus according to claim 11, wherein the image capture conditions set by the user include at least one of image blur correction strength setting, tracking strength setting, automatic image capture frequency setting, shutter speed setting, or power saving setting.

13. The image capturing apparatus according to claim 9, wherein the second calculation unit changes the second threshold value depending on a state of the image capturing apparatus.

14. The image capturing apparatus according to claim 13, wherein the state of the image capturing apparatus includes at least one of image capture scene, remaining battery level, total number of captured images or total shooting time within a predetermined amount of time, focal length, object luminance, or captured image transfer state.

15. The image capturing apparatus according to claim 8, wherein the second rotation amount includes a rotation amount for tracking to stopping an object in a predetermined position on a screen.

16. The image capturing apparatus according to claim 1, wherein the at least one processor or circuit is configured to further function as a third calculation unit configured to calculate a third rotation amount of the rotation device in response to a user instruction, wherein the stopping unit stops the rotation device in a case where the first to third rotation amounts are all less than threshold values respectively set for the first to third rotation amounts.

17. The image capturing apparatus according to claim 16, wherein the user instruction includes at least one of an instruction via an external device operation, a speech instruction, or a gesture instruction.

18. The image capturing apparatus according to claim 16, wherein the third calculation unit changes the third threshold value for the third rotation amount depending on a shooting mode set by a user.

19. The image capturing apparatus according to claim 18, wherein the shooting mode includes at least one of panorama shooting mode, time-lapse shooting mode, tracking shooting mode, or first person shooting mode.

20. The image capturing apparatus according to claim 1, wherein the stopping unit stops the rotation device by turning off power supply to the rotation device.

21. The image capturing apparatus according to claim 1, wherein the rotation device includes at least one rotation mechanism for rotating the image capture device about an axis.

22. A method of controlling an image capturing apparatus provided with an image capture device configured to capture an object image and a rotation device capable of rotating the image capture device, the method comprising:
calculating a first rotation amount of the rotation device for correcting image blur based on shaking of the image capturing apparatus;
calculating a second rotation amount for searching for an object from an image captured by the image capture device; and
stopping the rotation device in a case where both the first rotation amount and the second rotation amount are less than threshold values respectively set for the first rotation amount and the second rotation amount,
wherein in calculating the second rotation amount, when tracking an object so as to keep it at a predetermined position within a screen, a rotation amount of the rotation device to move the object to the predetermined position is calculated as the second rotation amount for the object existing outside a predetermined radius from the predetermined position and the second rotation amount is calculated as zero for an object existing within the predetermined radius from the predetermined position, and the predetermined radius is changed based on the importance level of the object.

23. A non-transitory computer-readable storage medium storing a program for causing a computer to execute a method of controlling an image capturing apparatus provided with an image capture device configured to capture an object image and a rotation device capable of rotating the image capture device, the method comprising:
calculating a first rotation amount of the rotation device for correcting image blur based on shaking of the image capturing apparatus;
calculating a second rotation amount for searching for an object from an image captured by the image capture device; and
stopping the rotation device in a case where both the first rotation amount and the second rotation amount are less than threshold values respectively set for the first rotation amount and the second rotation amount,
wherein in calculating the second rotation amount, when tracking an object so as to keep it at a predetermined position within a screen, a rotation amount of the rotation device to move the object to the predetermined position is calculated as the second rotation amount for the object existing outside a predetermined radius from the predetermined position and the second rotation amount is calculated as zero for an object existing within the predetermined radius from the predetermined position, and the predetermined radius is changed based on the importance level of the object.

24. An image capturing apparatus comprising:
an image capture device configured to capture an object image;
a rotation device capable of rotating the image capture device; and
at least one processor or circuit configured to function as:
a first calculation unit configured to calculate a first rotation amount of the rotation device for correcting image blur based on shaking of the image capturing apparatus;
a second calculation unit configured to calculate a second rotation amount for searching for an object from an image captured by the image capture device;
a third calculation unit configured to calculate a third rotation amount of the rotation device in response to a user instruction; and
a stopping unit configured to stop the rotation device in a case where the first to third rotation amounts are all less than threshold values respectively set for the first to third rotation amounts.

25. The image capturing apparatus according to claim 24, wherein the user instruction includes at least one of an instruction via an external device operation, a speech instruction, or a gesture instruction.

26. The image capturing apparatus according to claim 24, wherein the third calculation unit changes the third threshold value for the third rotation amount depending on a shooting mode set by a user.

27. The image capturing apparatus according to claim 18, wherein the shooting mode includes at least one of panorama shooting mode, time-lapse shooting mode, tracking shooting mode, or first person shooting mode.

\* \* \* \* \*